United States Patent
Iwami et al.

(10) Patent No.: US 7,209,707 B2
(45) Date of Patent: Apr. 24, 2007

(54) RADIO RECEIVING DEVICE, ARRAY PARAMETER OPTIMAL VALUE ESTIMATION METHOD, AND ARRAY PARAMETER OPTIMAL VALUE ESTIMATION PROGRAM

(75) Inventors: Masashi Iwami, Moriguchi (JP); Takeo Miyata, Moriguchi (JP); Yoshiharu Doi, Moriguchi (JP)

(73) Assignee: Sanyo Electric Co. Ltd., Moriguchi-Shi (JP)

( * ) Notice: Subject to any disclaimer, the term of this patent is extended or adjusted under 35 U.S.C. 154(b) by 239 days.

(21) Appl. No.: 10/507,020

(22) PCT Filed: Mar. 5, 2003

(86) PCT No.: PCT/JP03/02605

§ 371 (c)(1),
(2), (4) Date: Sep. 8, 2004

(87) PCT Pub. No.: WO03/077446

PCT Pub. Date: Sep. 18, 2003

(65) Prior Publication Data

US 2005/0085192 A1 Apr. 21, 2005

(30) Foreign Application Priority Data

Mar. 8, 2002 (JP) ............................. 2002-063837

(51) Int. Cl.
*H04B 1/00* (2006.01)
*H04B 15/00* (2006.01)
(52) U.S. Cl. ............... 455/63.4; 455/277.1; 455/562.1; 375/267; 375/340
(58) Field of Classification Search ............ 455/277.1, 455/562.1, 63.4; 375/260, 340, 347
See application file for complete search history.

(56) References Cited

U.S. PATENT DOCUMENTS

| 4,217,586 A | * | 8/1980 | McGuffin | .................... 342/380 |
| 6,028,901 A | * | 2/2000 | Huynh et al. | ................ 375/350 |
| 6,763,062 B1 | * | 7/2004 | Kohno et al. | ................ 375/220 |
| 2002/0032015 A1 | | 3/2002 | Kitakado et al. | |

FOREIGN PATENT DOCUMENTS

| EP | 1 189 364 A1 | 3/2002 |
| JP | 01-238322 | 9/1989 |
| JP | 2002-026788 | 1/2002 |
| JP | 2002-043995 | 2/2002 |
| WO | WO 00/79702 A1 | 12/2000 |

OTHER PUBLICATIONS

N. Kikuma, "Chapter 3: MMSE Adaptive Array," Adaptive Signal Processing by Array Antenna, pp. 35-49; (including partial translation pp. 1-7).

* cited by examiner

*Primary Examiner*—Quochien B. Vuong
*Assistant Examiner*—Tuan H. Nguyen
(74) *Attorney, Agent, or Firm*—Foley & Lardner LLP

(57) ABSTRACT

A spatial multiplex base station (1000, 2000, 3000) estimates an optimal array parameter appropriate to a propagation environment of a received signal and changes the array parameter in an adaptive manner. The optimal value is estimated by referring to a table prepared in advance, by searching for the optimal value while executing an array process multiple times using different parameters, or by searching for the optimal value from the results of the previous frames. Consequently, a weight estimation sequential algorithm is executed based on the estimated array parameter. This enables realization of optimal signal reception in a radio receiving device, regardless of the propagation environment.

30 Claims, 10 Drawing Sheets

FIG. 1

| PROPAGATION ENVIRONMENT | | OPTIMAL ARRAY PARAMETER | |
|---|---|---|---|
| THE DEGREE OF MULTIPLEXING | FADING | CORRELATION INITIAL VALUE | UPDATING STEP |
| 1 | FD < 7 [Hz] | 10 | 0.980 |
| 1 | FD > 7 [Hz] | 10 | 0.909 |
| 2 | FD < 7 [Hz] | 100 | 0.980 |
| 2 | FD > 7 [Hz] | 100 | 0.909 |
| 3 | FD < 7 [Hz] | 150 | 0.970 |
| 3 | FD > 7 [Hz] | 150 | 0.909 |
| 4 | FD < 7 [Hz] | 200 | 0.960 |
| 4 | FD > 7 [Hz] | 200 | 0.909 |

FIG. 5A

○ T SLOT

| | UPDATING STEP | WEIGHT ERROR |
|---|---|---|
| PARAMETER 1 | 0.975 | 2000 |
| PARAMETER 2 | 0.98 | 1000 |

→ SELECT PARAMETER 2 IN THE SUBSEQUENT FRAME

FIG. 5B

○ T+1 SLOT

| | UPDATING STEP | WEIGHT ERROR |
|---|---|---|
| PARAMETER 1 | 0.98 | 800 |
| PARAMETER 2 | 0.985 | 650 |

→ SELECT PARAMETER 2 IN THE SUBSEQUENT FRAME

FIG. 5C

○ T+2 SLOT

| | UPDATING STEP | WEIGHT ERROR |
|---|---|---|
| PARAMETER 1 | 0.985 | 1200 |
| PARAMETER 2 | 0.99 | 1500 |

→ SELECT PARAMETER 1 IN THE SUBSEQUENT FRAME

FIG. 8A

OT ~ T+100 SLOT

| | UPDATING STEP | AVERAGE WEIGHT ERROR |
|---|---|---|
| PARAMETER 1 | 0.975 | 2000 |

FIG. 8B

OT+100 ~ T+200 SLOT

| | UPDATING STEP | AVERAGE WEIGHT ERROR |
|---|---|---|
| PARAMETER 2 | 0.98 | 1000 |

FIG. 8C

OT+200 ~ T+300 SLOT

| | UPDATING STEP | AVERAGE WEIGHT ERROR |
|---|---|---|
| PARAMETER 3 | 0.985 | 800 |

FIG. 8D

OT+300 ~ T+400 SLOT

| | UPDATING STEP | AVERAGE WEIGHT ERROR |
|---|---|---|
| PARAMETER 4 | 0.99 | 1200 |

RADIO RECEIVING DEVICE, ARRAY PARAMETER OPTIMAL VALUE ESTIMATION METHOD, AND ARRAY PARAMETER OPTIMAL VALUE ESTIMATION PROGRAM

TECHNICAL FIELD

The present invention relates to a radio receiving device, an array parameter optimal value estimation method and an array parameter optimal value estimation program. More particularly, the present invention relates to a radio receiving device which extracts a desired user's signal by adaptive array processing, and an array parameter optimal value estimation method and an array parameter optimal value estimation program for use in such a radio receiving device.

BACKGROUND ART

In recent years, for rapidly developing mobile communication systems (for example, Personal Handy-phone Systems; referred to as PHS, hereinafter), there has been proposed a system which, in communication between a radio base device (base station) and mobile terminal devices (terminals), extracts received signals from a desired user's terminal by adaptive array processing, particularly at the base station.

The adaptive array process is a process in which based on signals received from terminals, a weight vector consisting of reception factors (weights) for the respective antennas in the base station is estimated and adaptive control is performed, so as to accurately extract a signal from a particular terminal.

There is provided at the base station a reception weight vector calculating unit for estimating such a weight vector for every symbol of received signals. The reception weight vector calculating unit executes a process for converging the weight vector to reduce the square of the error between a known reference signal and the sum of the results of the complex multiplication of received signals by the estimated weight vector, namely the adaptive array process for converging the reception directivity from a particular terminal.

In the adaptive array process, such convergence of the weight vector is performed in an adaptive manner in accordance with time or fluctuation of propagation path characteristics of signal radio waves, to remove interfering components or noise from the received signals to extract signals received from a particular terminal. Such an adaptive array process is expected to realize effective frequency utilization, transmission electric power reduction, improved communication quality, etc.

The reception weight vector calculating unit uses a sequential estimation algorithm such as RLS (Recursive Least Squares) algorithm, or LMS (Least Mean Square) algorithm, as the weight estimation algorithm.

Such RLS algorithm and LMS algorithm are well-known techniques in the field of adaptive array processing, and described in detail, for example, in "Chapter 3: MMSE Adaptive Array" in pp. 35–49 of "Adaptive Signal Processing by Array Antenna" by Nobuyoshi Kikuma (Kagaku Gijutsu Shuppan, Nov. 25, 1998). Therefore, description thereof will be omitted here.

Further, for mobile communication systems such as PHSs, in order to enhance radio wave frequency utilization efficiency, there has been proposed a PDMA (Path Division Multiple Access) system in which a single time slot is frequency-divided and a single frequency of a single time slot can be spatially divided to allow multiple users' terminals to access in multiple to a base station. In such a PDMA system, currently, the aforementioned adaptive array technique is used for realizing spatial multiplex accesses.

By the adaptive array proceeding as aforementioned, up-link signals from the respective antennas of a plurality of multiplexed users' terminals are received by the array antenna of a base station and separately extracted with reception directivity.

According to the PHS standard, four slots for realizing up-link communication and four slots for realizing down-link communication are provided in each frame.

A sequential estimation algorithm such as RLS or LMS employed in the aforementioned adaptive array processing requires setting of various types of parameters (hereinafter, referred to as array parameters) such as initial values or updating steps. The weight estimating ability of the sequential estimation algorithm varies depending on the set values of these array parameters.

More specifically, RLS algorithm requires two initial values, i.e., a weight initial value and a correlation initial value, and one updating step. LMS algorithm requires one weight initial value and one updating step.

The propagation environment of up-link signal radio waves from users' terminals diversely varies. Possible factors of such variations include various types of factors such as the degree of multiplexing of spatial multiple connections to the spatial multiplex base station, ratio of desired user's power to desired user's power (hereinafter, referred to as DD ratio), correlation values of received signals from multiplexed users, the amount of fading of multiplexed users' terminals, reception levels from multiplexed users' terminals, etc.

In conventional radio receiving devices using the adaptive array processing (e.g., spatial multiple base stations), various types of array parameters for the sequential estimation algorithm are fixed at predetermined values even if the propagation environment varies because of such various types of factors.

For example, in an adjustment stage before factory-shipment, the various types of array parameters of a radio receiving device are preset to predetermined values assuming harsh propagation environment (e.g., large fading condition) in order to realize favorable reception characteristics in such harsh propagation environment.

Since the various types of array parameters of a radio receiving device are preset to fixed predetermined values, there has been a problem that in a certain propagation environment the weight estimating ability is optimized with the predetermined array parameter values enabling optimal reception from a desired user terminal, but in different propagation environments the weight estimating ability is degraded with the array parameters, preventing optimal reception, which results in reception errors.

Therefore, it is an object of the present invention to provide radio receiving devices, array parameter optimal value estimation methods and array parameter optimal value estimation programs which estimate optimal values of array parameters appropriate to the propagation environment of received signals and change the array parameters in an adaptive manner to optimize the weight estimating ability regardless of variations of the propagation environment, thereby realizing optimal signal reception.

DISCLOSURE OF THE INVENTION

According to one aspect of the present invention, a radio receiving device which has a plurality of antennas and which extracts a desired signal by adaptive array processing includes adaptive array processing means and array parameter optimal value estimation means. The adaptive array processing means estimates weights for the plurality of antennas using a predetermined type of array parameter, assigns the estimated weights to reception signals received by the plurality of antennas, and combines the weighted reception signals to extract the desired signal. The array parameter optimal value estimation means estimates an optimal value of the predetermined type of array parameter which optimizes the weight estimation performance of the adaptive array processing means.

Preferably, the array parameter optimal value estimation means includes determination means for determining a propagation environment of the reception signals, storage means for previously storing a table consisting of optimal values of the array parameter corresponding to different conditions of the propagation environment, and table reference means for referring to the table, thereby estimating an optimal value of the array parameter appropriate to the propagation environment of the reception signals determined by the determination means.

Preferably, the array parameter optimal value estimation means includes operation control means for causing the adaptive array processing means to operate multiple times in a single time slot, in correspondence with a plurality of values of the array parameter, indicator calculation means for calculating an indicator representing the weight estimation performance of the adaptive array processing means corresponding to a current value of the array parameter, each time the adaptive array processing means is operated, and optimal value estimation means for estimating a value of the array parameter which optimizes the weight estimation performance of the adaptive array processing means in the time slot, based on the calculated indicators.

Preferably, the operation control means employs, as one of the plurality of values of the array parameter in a succeeding time slot, the value of the array parameter estimated by the optimal value estimation means in a preceding time slot, and the optimal value estimation means estimates, based on the indicators calculated by the indicator calculation means over a plurality of time slots, a value of the array parameter which optimizes the weight estimation performance of the adaptive array processing means over the plurality of time slots.

Preferably, the array parameter optimal value estimation means includes operation control means for causing the adaptive array processing means to operate in each of a plurality of time slots using a value of the array parameter which is fixed over the plurality of time slots, indicator calculation means for calculating an indicator representing the weight estimation performance of the adaptive array processing means corresponding to a current fixed value of the array parameter each time the adaptive array processing means is operated, averaging means for averaging the calculated indicators over the plurality of time slots, repeat control means for causing the operation control means, the indicator calculation means and the averaging means to repeatedly execute their operations over the plurality of time slots; and optimal value estimation means for determining a value of the array parameter which optimizes the weight estimation performance of the adaptive array processing means, based on the indicators each averaged by the averaging means over the corresponding plurality of time slots.

According to another aspect of the present invention, a radio receiving device which has a plurality of antennas and which enables spatial multiple connection of a plurality of users' terminals by adaptive array processing, includes adaptive array processing means and array parameter optimal value estimation means. The adaptive array processing means is provided in correspondence with the respective users' terminals and estimates weights for the plurality of antennas using a predetermined type of array parameter, assigns the estimated weights to reception signals received by the plurality of antennas, and combines the weighted reception signals to extract signals from the corresponding users' terminals. The array parameter optimal value estimation means estimates optimal values of the predetermined type of array parameter which optimize the weight estimation performance of the respective adaptive array processing means. The array parameter optimal value estimation means includes determination means for determining a propagation environment of the reception signals, storage means for previously storing a table consisting of optimal values of the array parameter corresponding to different conditions of the propagation environment, and table reference means for referring to the table, thereby estimating an optimal value of the array parameter appropriate to the propagation environment of the reception signals determined by the determination means.

Preferably, the propagation environment is at least one of the degree of multiplexing of spatial multiple connection and the amount of fading.

According to further aspect of the present invention, a radio receiving device which has a plurality of antennas and which enables spatial multiple connection of a plurality of users' terminals by adaptive array processing includes adaptive array processing means and array parameter optimal value estimation means. The adaptive array processing means is provided in correspondence with the respective users' terminals and estimates weights for the plurality of antennas using a predetermined type of array parameter, assigns the estimated weights to reception signals received by the plurality of antennas, and combines the weighted reception signals to extract a signal from the corresponding users' terminal. The array parameter optimal value estimation means estimates optimal values of the predetermined type of array parameter which optimize the weight estimation performance of the respective adaptive array processing means. The array parameter optimal value estimation means includes operation control means for causing the adaptive array processing means to operate multiple times in a single time slot, in correspondence with a plurality of values of the array parameter, indicator calculation means for calculating an indicator representing the weight estimation performance of the adaptive array processing means corresponding to a current value of the array parameter, each time the adaptive array processing means is operated, and optimal value estimation means for estimating a value of the array parameter which optimizes the weight estimation performance of the adaptive array processing means in the time slot, based on the calculated indicators.

Preferably, the operation control means employs, as one of the plurality of values of the array parameter in a succeeding time slot, the value of the array parameter estimated by the optimal value estimation means in a preceding time slot; and the optimal value estimation means estimates, based on the indicators calculated by the indicator calculation means over a plurality of time slots, a value of the array parameter which optimizes the weight estimation performance of the adaptive array processing means over the plurality of time slots.

According to further aspect of the present invention, a radio receiving device which has a plurality of antennas and which enables spatial multiple connection of a plurality of users' terminals by adaptive array processing, includes adaptive array processing means and array parameter optimal value estimation means. The adaptive array processing means is provided in correspondence with the respective users' terminals and estimates weights for the plurality of antennas using a predetermined type of array parameter, assigns the estimated weights to reception signals received by the plurality of antennas, and combines the weighted reception signals to extract signals from the corresponding users' terminals. The array parameter optimal value estimation means estimates optimal values of the predetermined type of array parameter which optimize the weight estimation performance of the respective adaptive array processing means. The array parameter optimal value estimation means includes operation control means for causing the adaptive array processing means to operate in each of a plurality of time slots using a value of the array parameter which is fixed over the plurality of time slots, indicator calculation means for calculating an indicator representing the weight estimation performance of the adaptive array processing means corresponding to a current fixed value of the array parameter, each time the adaptive array processing means is operated, averaging means for averaging the calculated indicators over the plurality of time slots, repeat control means for causing the operation control means, the indicator calculation means and the averaging means to repeatedly execute their operations over the plurality of time slots, and optimal value estimation means for determining a value of the array parameter which optimizes the weight estimation performance of the adaptive array processing means, based on the indicators each averaged by the averaging means over the corresponding plurality of time slots.

Preferably, the indicator representing the weight estimation performance of the adaptive array processing means is a weight estimation error.

According to a further aspect of the present invention, an array parameter optimal value estimation method for use in a radio receiving device which has a plurality of antennas and which extracts a desired signal by adaptive array processing includes the steps of executing adaptive array processing for estimating weights for the plurality of antennas using a predetermined type of array parameter, assigning the estimated weights to reception signals received by the plurality of antennas, and combining the weighted reception signals to extract the desired signal, and estimating an optimal value of the predetermined type of array parameter which optimizes the weight estimation performance of the adaptive array processing.

Preferably, the step of estimating an optimal value of the array parameter includes the steps of determining the propagation environment of the reception signals, preparing in advance a table consisting of optimal values of the array parameter corresponding to different conditions of the propagation environment, and referring to the table, thereby estimating an optimal value of the array parameter appropriate to the determined propagation environment of the reception signals.

Preferably, the step of estimating an optimal value of the array parameter includes the steps of causing the adaptive array processing step to be executed multiple times in a single time slot, in correspondence with a plurality of values of the array parameter, calculating an indicator representing the weight estimation performance of the adaptive array processing corresponding to a current value of the array parameter, each time the adaptive array processing step is executed, and estimating a value of the array parameter which optimizes the weight estimation performance of the adaptive array processing in the time slot, based on the calculated indicators.

Preferably, the step of causing the adaptive array processing step to be executed multiple times includes the step of employing the value of the array parameter estimated in a preceding time slot, as one of the plurality of values of the array parameter in a succeeding time slot; and the step of estimating a value of the array parameter includes the step of estimating, based on the indicators calculated over a plurality of time slots, a value of the array parameter which optimizes the weight estimation performance of the adaptive array processing means over the plurality of time slots.

Preferably, the step of estimating an optimal value of the array parameter includes the steps of causing the adaptive array processing step to be executed in each of a plurality of time slots using a value of the array parameter which is fixed over the plurality of time slots, calculating an indicator representing the weight estimation performance of the adaptive array processing corresponding to a current fixed value of the array parameter each time the adaptive array processing step is executed, averaging the calculated indicators over the plurality of time slots, causing the operations of the steps of causing the adaptive array processing step to be executed, calculating the indicator, and averaging over the plurality of time slots to be executed repeatedly; and determining a value of the array parameter which optimizes the weight estimation performance of the adaptive array processing, based on the indicators each averaged over the plurality of time slots.

According to a further aspect of the present invention, an array parameter optimal value estimation method for use in a radio receiving device which has a plurality of antennas and which enables spatial multiple connection of a plurality of users' terminals by adaptive array processing includes the steps of executing, for the respective users' terminals, the adaptive array processing for estimating weights for the plurality of antennas using a predetermined type of array parameter, assigning the estimated weights to reception signals received by the plurality of antennas, and combining the weighted reception signals to extract a signal from the corresponding user's terminals, estimating an optimal value of the predetermined type of array parameter which optimizes the weight estimation performance of the adaptive array processing; the step of estimating the optimal value of the array parameter includes the steps of determining the propagation environment of the reception signals, preparing in advance a table consisting of optimal values of the array parameter corresponding to different conditions of the propagation environment, and referring to the table, thereby estimating an optimal value of the array parameter appropriate to the determined propagation environment of the determined reception signals.

Preferably, the propagation environment is at least one of the degree of multiplexing of spatial multiplex connection and the amount of fading.

According to a further aspect of the present invention, an array parameter optimal value estimation method for use in a radio receiving device which has a plurality of antennas and which enables spatial multiple connection of a plurality of users' terminals by adaptive array processing includes the steps of executing, for the respective users' terminals, the adaptive array processing for estimating weights for the plurality of antennas using a predetermined type of array parameter, assigning the estimated weights to reception signals received by the plurality of antennas, and combining the weighted reception signals to extract a signal from the corresponding users' terminals; and estimating an optimal value of the predetermined type of array parameter which optimizes the weight estimation performance of each adaptive array processing; the step of estimating an optimal value of the array parameter comprising the steps of causing the adaptive array processing step to be executed multiple times in a single time slot, in correspondence with a plurality of values of the array parameter; calculating an indicator representing the weight estimation performance of the adaptive array processing corresponding to a current value of the array parameter, each time the adaptive array processing step is executed; and estimating a value of the array parameter which optimizes the weight estimation performance of the adaptive array processing in the time slot, based on the calculated indicators.

Preferably, the step of causing the adaptive array processing step to be executed multiple times includes the step of employing the value of the array parameter estimated in a preceding time slot, as one of the plurality of values of the array parameter in a succeeding time slot; and the step of estimating a value of the array parameter includes the step of estimating, based on the indicators calculated over a plurality of time slots, a value of the array parameter which optimizes the weight estimation performance of the adaptive array processing over the plurality of time slots.

According to a further aspect of the present invention, an array parameter optimal value estimation method for use in a radio receiving device (2000) which has a plurality of antennas (A1 to A4) and which enables spatial multiple connection of a plurality of users' terminals by adaptive array processing includes the steps of executing, for the respective users' terminals, the adaptive array processing for estimating weights for the plurality of antennas using a predetermined type of array parameter, assigning the estimated weights to reception signals received by the plurality of antennas, and combining the weighted reception signals to extract a signal from the corresponding users' terminals; and estimating an optimal value of the predetermined type of array parameter which optimizes the weight estimation performance of the adaptive array processing; the step of estimating an optimal value of the array parameter includes the steps of causing the adaptive array processing step to be executed in each of a plurality of time slots using a value of the array parameter which is fixed over the plurality of time slots, calculating an indicator representing the weight estimation performance of the adaptive array processing corresponding to a current fixed value of the array parameter, each time the adaptive array processing step is executed; averaging the calculated indicators over the plurality of time slots; causing the operations of the steps of causing the adaptive array processing step to be executed, calculating the indicator, and averaging over the plurality of time slots to be executed repeatedly; and determining a value of the array parameter which optimizes the weight estimation performance of the adaptive array processing, based on the indicators each averaged over the plurality of time slots.

Preferably, the indicator representing the weight estimation performance of the adaptive array processing is a weight estimation error.

According to a further aspect of the present invention, an array parameter optimal value estimation program for use in a radio receiving device (1000) which has a plurality of antennas and which extracts a desired signal by adaptive array processing, the program causing a computer to execute the steps of executing the adaptive array processing for estimating weights for the plurality of antennas using a predetermined type of array parameter, assigning the estimated weights to reception signals received by the plurality of antennas, and combining the weighted reception signals to extract the desired signal; and estimating an optimal value of the predetermined type of array parameter which optimizes the weight estimation performance of the adaptive array processing.

Preferably, the step of estimating an optimal value of the array parameter includes the steps of determining the propagation environment of the reception signals; preparing in advance a table consisting of optimal values of the array parameter corresponding to different conditions of the propagation environment; and referring to the table, thereby estimating an optimal value of the array parameter appropriate to the determined propagation environment of the reception signals.

Preferably, the step of estimating an optimal value of the array parameter includes the steps of causing the adaptive array processing step to be executed multiple times in a single time slot, in correspondence with a plurality of values of the array parameter; calculating an indicator representing the weight estimation performance of the adaptive array processing corresponding to a current value of the array parameter, each time the adaptive array processing step is executed; and estimating a value of the array parameter which optimizes the weight estimation performance of the adaptive array processing in the time slot, based on the calculated indicators.

Preferably, the step of causing the adaptive array processing step to be executed multiple times includes the step of employing the value of the array parameter estimated in a preceding time slot, as one of the plurality of values of the array parameter in a succeeding time slot; and the step of estimating a value of the array parameter includes the step of estimating, based on the indicators calculated over a plurality of time slots, a value of the array parameter which optimizes the weight estimation performance of the adaptive array processing over the plurality of time slots.

Preferably, the step of estimating an optimal value of the array parameter includes the steps of causing the adaptive array processing step to be executed in each of a plurality of time slots using a value of the array parameter which is fixed over the plurality of time slots; calculating an indicator representing the weight estimation performance of the adaptive array processing corresponding to a current fixed value of the array parameter, each time the adaptive array processing step is executed; averaging the calculated indicators over the plurality of time slots; causing the operations of the steps of causing the adaptive array processing step to be executed, calculating the indicator, and averaging over the plurality of time slots to be executed repeatedly; and determining a value of the array parameter which optimizes the weight estimation performance of the adaptive array processing, based on the indicators each averaged over the plurality of time slots.

According to a further aspect of the present invention, an array parameter optimal value estimation program for use in a radio receiving device which has a plurality of antennas and which enables spatial multiple connection of a plurality of users' terminals by adaptive array processing, the program causing a computer to execute the steps of executing, for the respective users' terminals, the adaptive array processing for estimating weights for the plurality of antennas using a predetermined type of array parameter, assigning the estimated weights to reception signals received by the plurality of antennas, and combining the weighted reception signals to extract a signal from the corresponding users' terminals; and estimating an optimal value of the predetermined type of array parameter which optimizes the weight estimation performance of the adaptive array processing; the step of estimating an optimal value of the array parameter includes the steps of determining a propagation environment of the reception signals; preparing in advance a table consisting of optimal values of the array parameter corresponding to different conditions of the propagation environment; and referring to the table, thereby estimating an optimal value of the array parameter appropriate to the determined propagation environment of the reception signals.

Preferably, the propagation environment is at least one of the degree of multiplexing of spatial multiple connection and the amount of fading.

According to a further aspect of the present invention, an array parameter optimal value estimation program for use in a radio receiving device which has a plurality of antennas and which enables spatial multiple connection of a plurality of users' terminals by adaptive array processing, the program causing a computer to execute the steps of executing, for the respective users' terminals, the adaptive array processing for estimating weights for the plurality of antennas using a predetermined type of array parameter, assigning the estimated weights to reception signals received by the plurality of antennas, and combining the weighted reception signals to extract a signal from the corresponding users' terminals; and estimating an optimal value of the predetermined type of array parameter which optimizes the weight estimation performance of the respective adaptive array processing; the step of estimating an optimal value of the array parameter includes the steps of causing the adaptive array processing step to be executed multiple times in a single time slot, in correspondence with a plurality of values of the array parameter; calculating an indicator representing the weight estimation performance of the adaptive array processing corresponding to a current value of the array parameter, each time the adaptive array processing step is executed; and estimating a value of the array parameter which optimizes the weight estimation performance of the adaptive array processing in the time slot, based on the calculated indicators.

Preferably, the step of causing the adaptive array processing step to be executed multiple times includes the step of employing the value of the array parameter estimated in a preceding time slot, as one of the plurality of values of the array parameter in a succeeding time slot; and the step of estimating a value of the array parameter includes the step of estimating, based on the indicators calculated over a plurality of time slots, a value of the array parameter which optimizes the weight estimation performance of the adaptive array processing means over the plurality of time slots.

According to a further aspect of the present invention, an array parameter optimal value estimation program for use in a radio receiving device which has a plurality of antennas and which enables spatial multiple connection of a plurality of users' terminals by adaptive array processing, the program causing a computer to execute the steps of executing, for the respective users' terminals, adaptive array processing for estimating weights for the plurality of antennas using a predetermined type of array parameter, assigning the estimated weights to reception signals received by the plurality of antennas, and combining the weighted reception signals to extract a signal from the corresponding users' terminals;

and estimating an optimal value of the predetermined type of array parameter which optimizes the weight estimation performance of the adaptive array processing; the step of estimating an optimal value of the array parameter includes the steps of causing the adaptive array processing step to be executed in each of a plurality of time slots using a value of the array parameter which is fixed over the plurality of time slots, calculating an indicator representing the weight estimation performance of the adaptive array processing means corresponding to a current fixed value of the array parameter, each time the adaptive array processing step is executed; averaging the calculated indicators over the plurality of time slots; causing the operations of the steps of causing the adaptive array processing step to be executed, calculating the indicator, and averaging over the plurality of time slots to be executed repeatedly; and determining a value of the array parameter which optimizes the weight estimation performance of the adaptive array processing means, based on the indicators each averaged over the plurality of time slots.

Preferably, the indicator representing the weight estimation performance of the adaptive array processing means is a weight estimation error.

Therefore, according to the present invention, in a radio receiving device which extracts a desired signal by the adaptive array process, optimal values of array parameters appropriate to the propagation environment of received signals are estimated and the array parameters are changed in an adaptive manner, and therefore the weight estimating ability is optimized regardless of the variation of the propagation environment, thereby realizing optimal signal reception.

BRIEF DESCRIPTION OF THE DRAWINGS

FIG. 1 is a table showing the relation between a propagation environment and an optimal array parameter according to Embodiment 1 of the present invention.

FIGS. 5A to 5C are tables each exemplifying optimal array parameter estimation processes according to Embodiment 2 of the present invention.

FIGS. 8A to 8D are tables each exemplifying optimal array parameter estimation processes according to Embodiment 3 of the present invention.

BEST MODES FOR CARRYING OUT THE INVENTION

Figure 2:
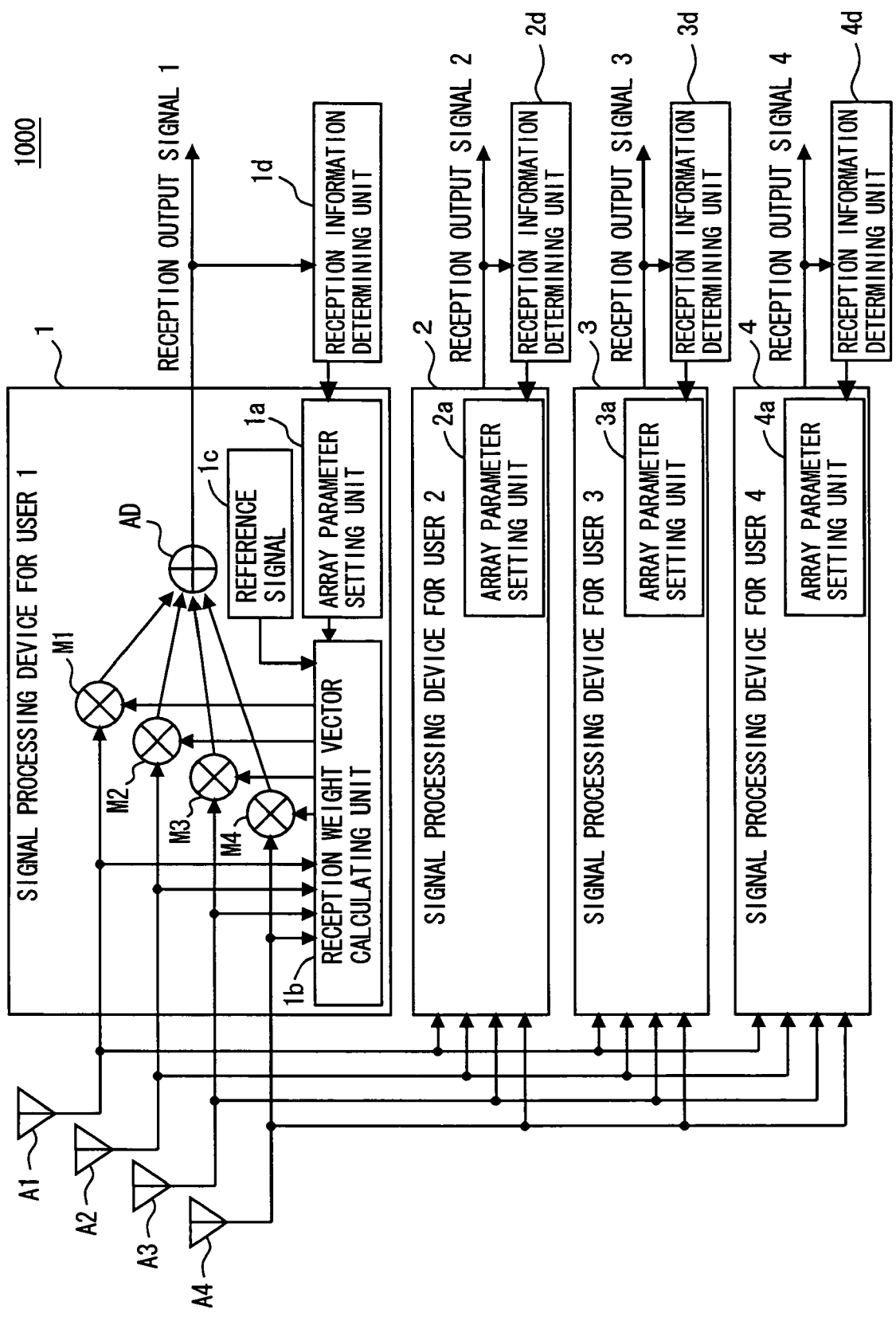
FIG. 2 is a functional block diagram showing a structure of a spatial multiplexing base station according to Embodiment 1 of the present invention.

Hereinafter, embodiments of the present invention will be described in detail with reference to the drawings. In the figures, the same or corresponding portions will be denoted by the same reference characters; therefore, description thereof will not be repeated.

As described above, the present invention aims to estimate an optimal value of an array parameter appropriate to a propagation environment so as to optimize weight estimation ability regardless of the propagation environment. As such an array parameter optimal value estimation method, for example, Embodiments 1 to 3, which will be described later, are possible.

Embodiment 1

First, the principle of an array parameter optimal value estimation method according to Embodiment 1 of the present invention will be described.

According to Embodiment 1, optimal values of various array parameters appropriate to varying propagation environment are determined beforehand, and a table representing a relation between the propagation environment and optimal parameter values is made beforehand.

Then, the actual propagation environment is measured and the aforementioned table is referred to retrieve array parameter values appropriate to the determined propagation environment to estimate optimal array parameters for this propagation environment.

FIG. 1 is a table representing a relation between the propagation environment and the optimal array parameters. In the example of FIG. 1, as factors representing variations of the propagation environment, the degree of multiplexing at a single slot in the special multiplexing base station and the amount of fading (the amount of fading is usually represented by a Doppler frequency FD) are employed, and the array parameters are the correlation initial value and the updating step.

The correlation initial value and the updating step have meanings as follows.

First, the correlation initial value is the initial gradient in the sequential update weight estimation method for bringing the weights closer to optimal weights every estimation. In the case the correlation initial value is large, the number of estimations required for bringing initial weights close to optimal values becomes small, but divergence is prone to occur. On the contrary, in the case this value is small, the number of estimations required for bringing the initial weights close to optimal values becomes large, but divergence is less prone to occur.

The updating step means a parameter determining how much previously-estimated weight values are maintained upon weight updating. The closer the updating step is to a maximum value of 1, the more largely the previously-estimated values are maintained. The closer the updating step is to a minimum value of 0, the less largely the previously-estimated values are maintained.

Referring to FIG. 1, the lower the degree of multiplexing, the fewer interfering components from other multiplexed terminals and the more favorable the propagation environment, but the higher the degree of multiplexing, the harsher the propagation environment. The smaller the fading (for example, Doppler frequency FD is smaller than 7 Hz), the more favorable the propagation environment, but the larger the fading (for example, Doppler frequency FD is greater than 7 Hz), the harsher the propagation environment.

Referring to the table of FIG. 1, as the degree of multiplexing increases, the weight must be converged faster since signal reception becomes harder. Therefore, as the degree of multiplexing increases, the optimal value of the correlation initial value becomes larger. Also, in low fading environments, for offering favorable characteristics, it is desirable to largely maintain the previous weights and therefore the optimal value of the updating step is large. In high fading environments, for offering favorable characteristics, it is desirable to less largely maintain the previous values and update the weights in real time, and therefore the optimal value of the updating step is small.

Further, as the degree of multiplexing increases, it becomes harder to determine the weights. Therefore, for offering favorable characteristics, it is desirable to maintain the previous weights as little as possible and update the weights in real time. Therefore, as the degree of multiplexing increases, the optimal value of the updating step becomes smaller.

Thus, by estimating optimal values of the array parameters appropriate to a current propagation environment from the table which was prepared in advance, it is possible to perform weight estimation appropriate to the actual propagation environment, as compared with conventional manners in which array parameters are fixed.

While in the example of FIG. 1 the degree of multiplexing in the base station and the fading speed are used as the factors representing the propagation environment, other factors may be used such as DD ratio of multiple users, correlation values of received signals from multiplexed users, reception levels of up-link signals from multiplexed users' terminals, etc.

Further, while in the example of FIG. 1 the array parameters depending on the propagation environment are the combination of two parameters, the correlation initial value and the updating step, any combination of parameters depending on the propagation environment may be used.

FIG. 2 is a functional block diagram showing the structure of a spatial multiplexing base station 1000 utilizing, for example, the table shown in FIG. 1, according to Embodiment 1 of the present invention. Spatial multiplexing base station 1000 is a base station capable of multiplexing four connections.

Referring to FIG. 2, base station 1000 includes an array antenna consisting of, for example, four antennas A1, A2, A3 and A4. Signals received by array antenna A1, A2, A3, and A4 are provided in common to a signal processing device 1 for user 1, a signal processing device 2 for user 2, a signal processing device for user 3 and a signal processing device 4 for user 4.

Signal processing devices 1 to 4 all have the same structured, and therefore only the structure of signal processing device 1 for user 1 is shown and the operation thereof will be described hereinafter.

There are provided reception information determining units 1*d*, 2*d*, 3*d* and 4*d* in correspondence with signal processing devices 1, 2, 3 and 4, respectively. Each reception information determining unit receives reception output signals output from the corresponding user signal processing device, measures a factor representing the propagation environment (the amount of fading in this case) in this slot in the previous frame, and outputs the measured factor to the corresponding user signal processing device.

Signal processing devices 1 to 4 and reception information determining units 1*d*, 2*d*, 3*d* and 4*d* are realized in software by a digital signal processor (DSP), not shown, in base station 1000.

Hereinafter, the operation of signal processing device 1 for user 1 will be described. A reception signal vector consisting of four sequences of reception signals received by antennas A1, A2, A3 and A4 is provided to respective inputs of multipliers M1, M2, M3 and M4 and also is provided to a reception weight vector calculating unit 1*b*.

Reception weight vector calculating unit 1*b* estimates a weight vector consisting of weights for the respective antennas by the aforementioned sequential estimation algorithm, using a reference signal stored in a memory 1*c*. Here, various array parameters (the initial value, the updating step, etc.) for the weight estimation algorithm are set by an array parameter setting unit 1*a* as will be described later.

The weight vector estimated by reception weight vector calculating unit 1*b* is provided to the other inputs of respective multipliers M1, M2, M3 and M4 where it is complex-multiplied with the received signal vector from the corresponding antennas. An adder AD sums up the results of the complex multiplications and outputs a reception output signal 1*b* which is the summed results.

Reception output signal 1 is provided to a modem not shown and also provided to reception information determining unit 1*d*. Reception information determining unit 1*d* determines the factor representing the propagation environment as previously described. In this example, it is assumed that reception information determining unit 1*d* measures the amount of fading in correspondence with the exemplary table of FIG. 1. As a physical value, the amount of fading is represented by a Doppler frequency FD.

Doppler frequency FD in the propagation environment is determined in the following manner, for example. Namely, it is determined by calculating a correlation value between two reception response vectors preceding and succeeding in time with respect to each other of received signals from this user, which have been extracted by the adaptive array processing.

When there is no fading, the two reception response vectors are in agreement with each other and the correlation value will be 1. On the other hand, when there is large fading, the deference between the reception response vectors becomes large and the correlation value becomes small. By experimentally determining beforehand the relation between such correlation values of reception response vectors and Doppler frequencies FD and storing the table in a memory, it is possible to estimate a current Doppler frequency FD by calculating a correlation value between reception response vectors.

Reception information determining unit 1*d* provides Doppler frequency FD determined as previously described to array parameter setting unit 1*a* in first user signal processing device 1.

A control unit in base station 1000, not shown, determines the degree of multiplexing which represents how many users' terminals are being multiplexed in a certain time slot of spatial multiplex base station 1000 and provides it to array parameter setting unit 1*a* in signal processing device 1 for user 1.

It is assumed that there is stored, in array parameter setting unit 1*a*, a table representing the relation between the propagation environment and optimal array parameters, for example, as shown in FIG. 1.

Depending on the provided Doppler frequency FD which is the reception information in the same slot in the previous frame and the degree of multiplexing in the base station, array parameter setting unit 1*a* determines optimal values of the array parameters, namely optimal values of the correlation initial value and the updating step, for the corresponding slot in this frame by referring to the table of FIG. 1 being stored. Then, array parameter setting unit 1*a* provides the determined optimal values to reception weight vector calculating unit 1*b*.

Thus, the array parameters (the correlation initial value and the updating step in this example) for the weight estimation algorithm of reception weight vector calculating unit 1*b* are set to optimal values appropriate to the actual propagation environment (the degree of multiplexing, and the amount of fading). Therefore, the weight estimation ability of reception weight vector calculating unit 1*b* is optimized, thereby enabling optimal reception of up-link signals from each of multiple users.

If the degree of multiplexing in this slot becomes more than one, other user signal processing devices 2 to 4 execute the same adaptive array process as that of signal processing device 1 for user 1 to receive signals.

Figure 3:
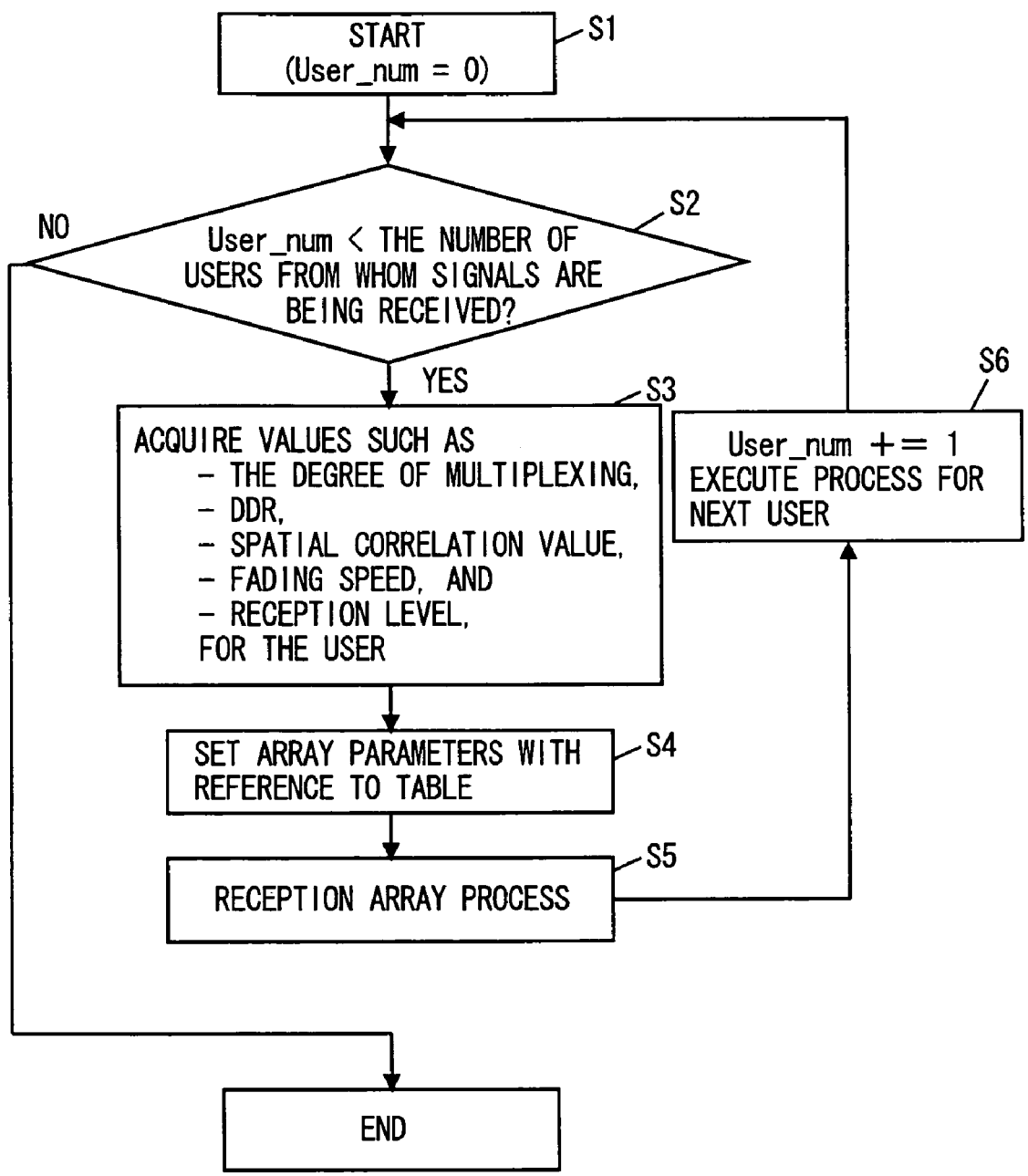
FIG. 3 is a flowchart showing an array parameter optimal value estimation method according to Embodiment 1 of the present invention.

FIG. 3 is a flowchart showing the process executed by the DSP in base station 100 of FIG. 2 for realizing the array parameter optimal values estimation method described with reference to FIGS. 1 and 2, according to Embodiment 1 of the present invention.

Referring to FIG. 3, first, the user number is initialized and the estimation process is started at step S1.

At step S2, if the user number has not reached the number of users from whom signals are being received, the process proceeds to step S3 where factors relating to the propagation environment of this user (for example, the degree of multiplexing and fading speeds (FD) as in the table of FIG. 1, DD ratio of multiplexed users, spatial correlation values, up-link reception levels from users, etc.) are acquired.

Then, at step S4, by referring to the table representing the relation between the propagation environment and optimal array parameters as in FIG. 1, optimal array parameters corresponding to the propagation environment factors acquired in step 3 are determined and set for the weight estimation algorithm.

Then, at step S5, the reception adaptive array process is executed based on the weight estimation algorithm to extract a reception output signal for this user.

Subsequently, at step S6, the processes at steps S2 to S5 are repeatedly executed while the user number is incremented one by one. At step S2, if the user number updated at step S6 exceeds the number of users from whom signals are being received, the process ends.

As described above, in accordance with Embodiment 1 of the present invention, the array parameters (the correlation initial value and the updating step in Embodiment 1) of the sequential estimation algorithm for estimating weight vectors are set to optimal values appropriate to the actual propagation environment (the degree of multiplexing and the amount of fading in Embodiment 1) and therefore the weight estimation ability is optimized, thereby enabling optimal reception of up-link signals from each of multiple users.

Further, in accordance with Embodiment 1 of the present invention, there is provided an advantage of ease of the control of the array parameter optimal values estimation, since the table prepared beforehand is employed.

Embodiment 2

Next, the principle of a method for estimating optimal values of the array parameters according to Embodiment 2 of the present invention will be described.

In conventional spatial multiplexing base stations, the adaptive array process is executed once in each slot for one user. However, according to Embodiment 2 of the present invention, only when there is leeway in the processing capacity of the spatial multiplexing base station, the adaptive array processing is executed multiple times in each slot for one user while the array parameters are changed and array parameters which yielded favorable process results are estimated to be optimal parameters.

Figure 4:
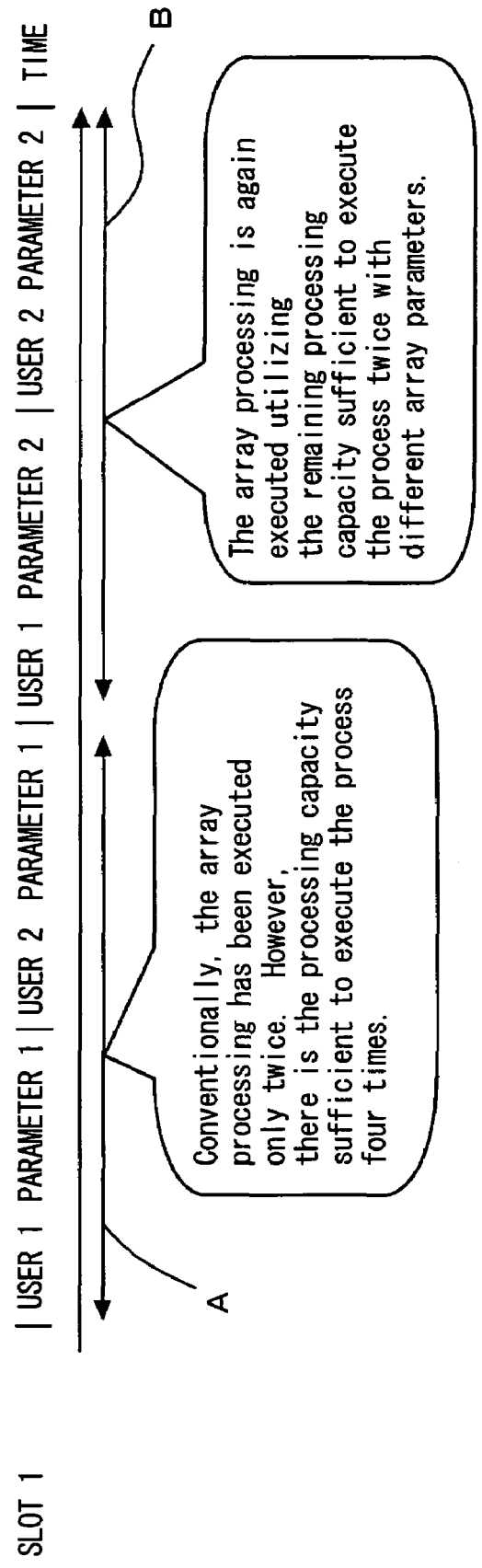
FIG. 4 schematically shows a principle of an operation according to Embodiment 2 of the present invention.

FIG. 4 is a diagram schematically showing the process of the present invention along a time axis of a single slot of the spatial multiplexing base station capable of multiplexing four connections.

In the example of FIG. 4, single slot 1 is divided into four sections along the time axis and the adaptive array process is executed for one user in each section.

However, the adaptive array processing may also be executed in parallel for more than one user in each slot by utilizing signal processing structures for the respective users in the spatial multiplexing base station as shown in FIG. 2, as well as serial processes time-divided along the time axis as shown in FIG. 4.

In actual, the adaptive array processing is executed in software by the DSP in the base station, and depending on the processing capacity of the base station, the adaptive array processing for multiple users may be executed either in serial or in parallel in each slot. In FIG. 4, for ease of understanding the invention, there is exemplified a case in which a single slot is time-divided allowing for multiplexing four connections.

Referring to FIG. 4, in this example, it is assumed that two users, namely user 1 and user 2, are being multiplexed, while a single slot is capable of multiplexing four users at the maximum.

In such a case, in conventional spatial multiplexing base stations, the adaptive processing has been executed only once for each of users 1 and 2, and therefore twice in total. Namely, in the section shown by arrow A in slot 1 in FIG. 4, the weight estimation algorithm has been executed for users 1 and 2, using the same array parameter 1.

However, since this spatial multiplexing base station has a capacity to process a maximum of four multiple users in each slot, the processing capacity capable of executing the process twice will remain unused in the section shown by arrow B. In conventional spatial multiplexing base stations, the adaptive array processing has not been executed in the section shown by arrow B.

In accordance with Embodiment 2 of the present invention, this processing capacity capable of executing the process twice, which has conventionally been unused, is used to execute a second adaptive array process for users 1 and 2 with the array parameter changed from in the first process.

Namely, the adaptive array process is executed for each of users 1 and 2 using parameter 1 in the section shown by arrow A in slot 1 in FIG. 4, and then the adaptive array process is executed for each of users 1 and 2 using parameter 2 in the section shown by arrow B.

Then, by comparing the result of the adaptive array processing using parameter 1 with the result of the adaptive array processing using parameter 2, the array parameter which yielded more favorable characteristics (a weight error, reception error, etc.) is selected, for each user.

Such multiple processing may be executed over a plurality of frames to estimate an optimal array parameter.

FIGS. 5A to 5C are tables exemplifying the processes for estimating an optimal parameter by such multiple array processing over a plurality of frames. In this example, it is assumed that the array processing may be executed twice for one user in the same slot in each frame.

Referring to FIG. 5A, first, the array process is executed twice using different array parameters for one user in this slot in a certain frame T. Namely, it is assumed that, for a user, the first adaptive array process was executed using an updating step of 0.975 as array parameter 1 and this resulted in an weight error of 2000, and the second adaptive array process was executed using an updating step of 0.98 as array parameter 2 and this resulted in an weight error of 1000.

Thus, in frame T, the use of parameter 2 (an updating step of 0.98) resulted in the more favorable weight error wherein the weight error is an indicator of the performance of the adaptive array process result, and therefore parameter 2 is selected as an array parameter for use in the subsequent frame.

Referring to FIG. 5B, in the corresponding slot in the subsequent frame T+1, the array process is executed twice for this user using different array parameters. Namely, it is assumed that, for the same user as previously described, the first adaptive array process was executed using an updating step of 0.98, which was parameter 2 selected in frame T, as array parameter 1 and this resulted in an weight error of 800. Further, it is assumed that the second adaptive array process was executed using a greater updating step of 0.985 as array parameter 2, resulting in further reducing the weight error to 650.

Thus, in frame T+1, the use of parameter 2 (an updating step of 0.985) resulted in the more favorable weight error wherein the weight error is an indicator of the performance of the adaptive array process result, and therefore parameter 2 is selected as an array parameter for use in the subsequent frame.

Referring to FIG. 5C, in the corresponding slot in subsequent frame T+2, the array process is executed twice for this user using different array parameters. Namely, it is assumed that, for the same user described above, the first adaptive array process was executed using, as array parameter 1, an updating step of 0.985 which was parameter 2 selected in frame T+1 and this resulted in an weight error of 1200. Further, it is assumed that the second adaptive array process was executed using a greater updating step of 0.99 as array parameter 2, resulting in rather increasing the weight error to 1500.

Thus, in frame T+2, the use of parameter 1 (an updating step of 0.985) resulted in the more favorable weight error wherein the weight error is an indicator of the performance of the adaptive array process result, and therefore parameter 1 is selected as an array parameter for use in the subsequent frame.

As described above, the array processing is executed twice in each slot over a plurality of frames, and an optimal value of the array parameter which results in a minimum weight error is searched for while the weight error values are monitored.

While in the example of FIGS. 5A to 5C the procedure for searching for an optimal value of the updating step as an array parameter has been described, once the estimation of an optimal value of the updating step has been completed, optimal values of other array parameters (for example, the correlation initial value, the weight initial value, etc.) are searched for with the same procedure.

Further, while in the example of FIGS. 5A to 5C, weight errors are used as indicators of the performance of the adaptive array process results, other indicators such as reception errors may be used.

When more than one user is being multiplexed, the aforementioned multiple array processing may be executed preferentially for a user for whom a particularly large weight error has been generated or a user for whom a reception error has been generated, in order that improved reception performance can be expected.

This method according to Embodiment 2 is premised on that there is a vacancy in the multiplexing state. In the aforementioned example, there has been described a case in which two connections are being multiplexed in a slot capable of multiplexing four connections. However, for example, when three connections are being multiplexed in a slot capable of multiplexing four connections, the processing capacity capable of executing a single array processing will remain unused. In such a case, only one user for whom a reception error has been generated may be selected from the three multiplexed users and the array processing may be executed twice for this user in the same slot using different parameters, for applying the optimal array parameter estimation method according to Embodiment 2.

Also, when one access is being multiplexed in a slot capable of multiplexing four connections, the processing capacity capable of executing the array process three times will be unused and therefore it is possible to execute the array processing three times for this user in the same slot using different parameters.

Namely, according to Embodiment 2 of the present invention, the maximum degree of multiplexing in the base station is not restricted, and depending on the adaptive array processing capacity of the base station, the adaptive array process is executed multiple times for a single user, and an optimal array parameter is searched for based on the results.

Figure 6:
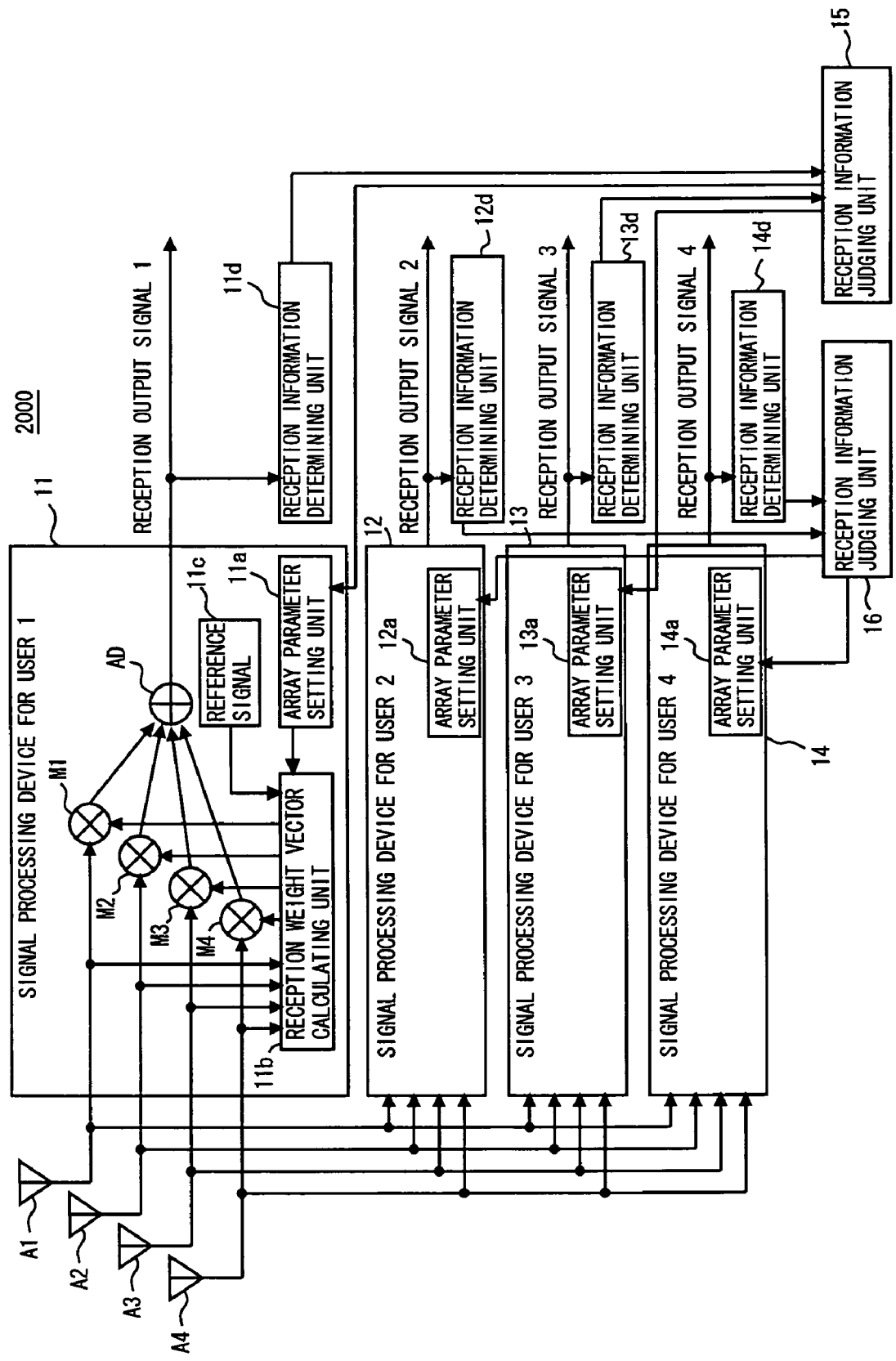
FIG. 6 is a functional block diagram showing a structure of a spatial multiplexing base station according to Embodiment 2 of the present invention.

FIG. 6 is a functional block diagram showing the structure of spatial multiplexing base station 2000 according to Embodiment 2 of the present invention, which has been described with reference to FIG. 4 and FIGS. 5A to 5C. Spatial multiplexing base station 2000 is a base station capable of multiplexing four connections.

Base station 2000 is different from base station 1000 in the following points.

Namely, there are provided user signal processing devices 11 to 14 instead of user signal processing devices 1 to 4 in FIG. 2, and also there are provided reception information determining units 11*d* to 14*d* instead of reception information determining units 1*d* to 4*d* in FIG. 2. Furthermore, in FIG. 6, there are provided reception information judging units 15, 16.

User signal processing devices 11 to 14 all have the same structured, and therefore only the structure of signal processing device 11 for user 1 is shown and the operation thereof will be described later. User signal processing devices shown in FIG. 6 have the same structure as the user signal processing devices in FIG. 2 except that the structure and functions of array parameter setting units 11*a* to 14*a* are different from those of array parameter setting units 1*a* to 4*a* of FIG. 2.

In the structure of FIG. 6, in a four-connection multiplexing state, user signal processing devices 11 to 14 are respectively assigned to four users 1 to 4, and signals from users 1 to 4 are separately extracted as reception output signals 1 to 4, respectively, by the adaptive array processing in the signal processing devices.

On the other hand, when two users, users 1 and 2, are being multiplexed in a slot capable of four-connection multiplexing as shown in FIG. 4 and FIGS. 5A to 5C, four signal processing devices 11 to 14 are assigned as follows, according to Embodiment 2 of the present invention.

Namely, signal processing device 11 is used for the first array processing using an array parameter 1-1 for user 1, signal processing device 12 is used for the first array processing using an array parameter 2-1 for user 2, signal processing device 13 is used for the second array processing using an array parameter 1-2 for user 1, and signal processing device 14 is used for the second array process using an array parameter 2-2 for user 2.

Reception information determining units 11*d* to 14*d* detect weight errors of the corresponding reception output signals. The detection results from determining units 11*d*, 13*d* are provided to reception information judging unit 15 and the detection results from determining units 12*d*, 14*d* are provided to reception information judging unit 16.

Reception information judging unit 15, for user 1, compares the weight error resulted from the use of array parameter 1-1 with the weight error resulted from the use of array parameter 1-2 and selects the array parameter that resulted in the smaller weight error. Then, reception information judging unit 15 sets the selected array parameter in array parameter setting units 11*a*, 13*a* in signal processing devices 11, 13 assigned to user 1, for preparing for the process in the subsequent frame.

Similarly, reception information judging unit 16, for user 2, compares the weight error resulted from the use of array parameters 2-1 with the weight error resulted from the use of array parameter 2-2 and selects the array parameter that resulted in the smaller weight error. Then, reception information judging unit 16 sets the selected array parameter in array parameter setting units 12*a*, 14*a* in signal processing devices 12, 14 assigned to user 2, for preparing for the process in the subsequent frame.

Based on the array parameters set as described above, user signal processing devices 11 to 14 execute weight estimation in the respective reception weight vector calculating units.

While the operation in a single slot has been described hereinbefore, such processes may be executed over a plurality of frames as shown in FIGS. 5A to 5C to search for an optimal array parameter for each user to optimize the weight estimation ability for each user, enabling optimal reception of up-signals from each user.

Figure 7:
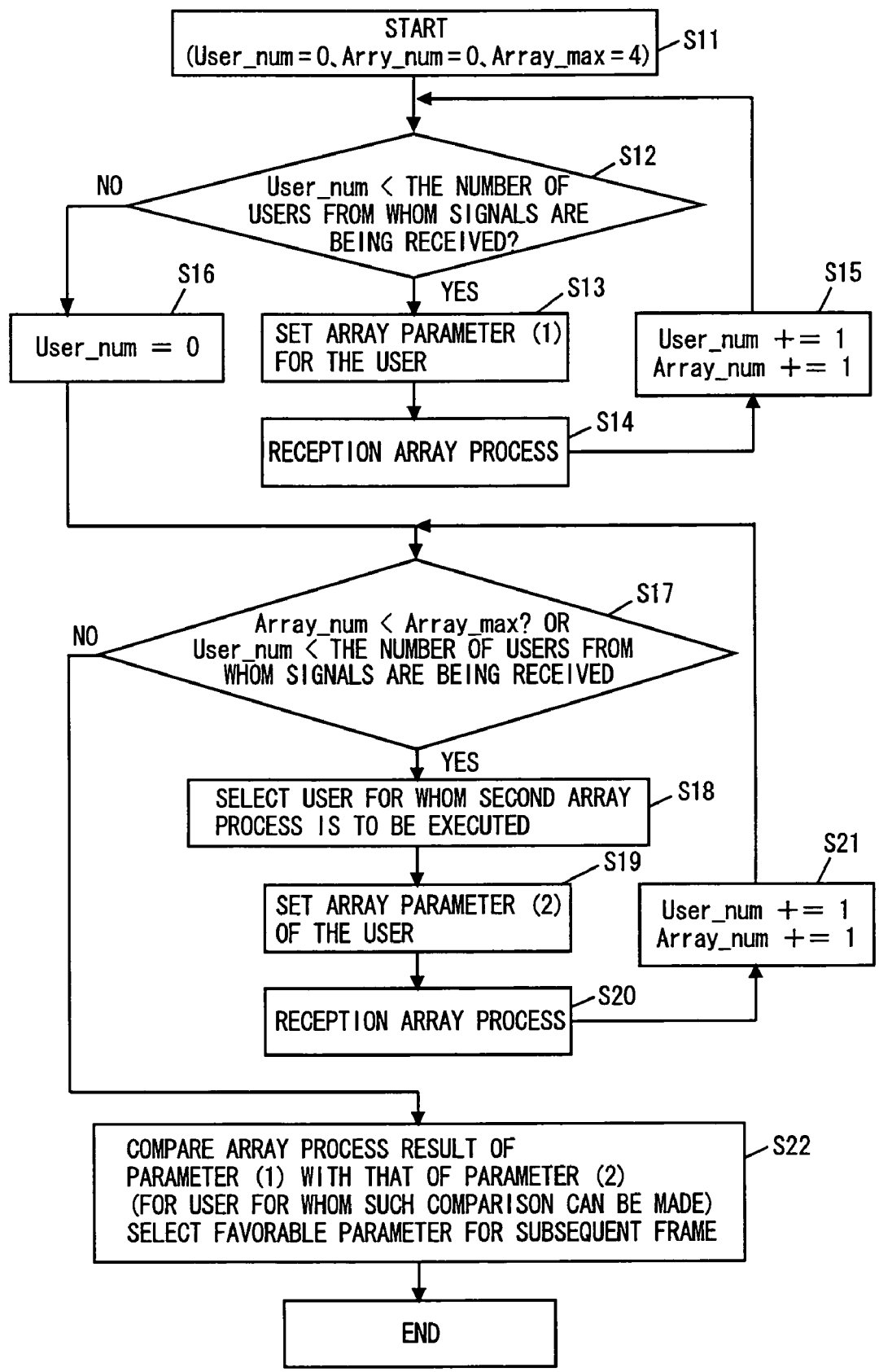
FIG. 7 is a flowchart showing an array parameter optimal value estimation method according to Embodiment 2 of the present invention.

FIG. 7 is a flowchart showing the process executed by the DSP in base station 2000 of FIG. 6 for realizing the array parameter optimal values estimation method described with reference to FIGS. 4 to 6, according to Embodiment 2 of the present invention.

Referring to FIG. 7, first, at step S11, the user number and the array number (the number of a user signal processing device which is assigned to a user) are initialized, the maximum degree of multiplexing is set to 4, and the estimation process is started.

At step S12, if the user number has not reached the number of users from whom signals are being received, the process proceeds to step S13 where array parameter 1 for this user is set, and then at step S14, the reception adaptive array process for this user is executed using array parameter 1.

Subsequently, the processes at steps S12 to S14 are repeatedly executed while the user number and the array number are incremented one by one at step S15. At step S12, if the user number updated at step S15 exceeds the number of users from whom signals are being received, the user number is initialized at step 16 and the process proceeds to step S17.

At step S17, if the array number has not reached the maximum degree of multiplexing, or if the user number has not reached the number of users from whom signals are being received, the process proceeds to step S18 where a user for whom the second array process is to be executed in the same slot is selected.

Then, the process proceeds to step S19 where array parameter 2 for this user is set, and then at step S20, the reception adaptive array process for this user is executed using array parameter 2.

Subsequently, the processes at steps S17 to S20 are repeatedly executed while the user number and the array number are incremented one by one at step S21. At step S17, if the array number updated at step S21 exceeds the maximum degree of multiplexing and the user number exceeds the number of users from whom signals are being received, the process proceeds to step S22.

At step S22, the array process results based on array parameters 1 and 2 are compared for users for whom such a comparison can be made, and the array parameter which yielded the more favorable result are selected and set as the array parameter for use in the subsequent frame. Then, the process ends.

As described above, in accordance with Embodiment 2 of the present invention, when there is leeway in the adaptive array processing capacity of the spatial multiplex base station, the array process is executed multiple times for each user in a single slot using different array parameters, and an optimal array parameter is searched for based on the results, thereby enabling easy estimation of an optimal value of the array parameter.

Moreover, this method enables real-time determination of an optimal array parameter appropriate to variations of the propagation environment, as compared with the method employing a table according to Embodiment 1.

Embodiment 3

Next, the principle of a method for estimating optimal values of array parameters according to Embodiment 3 of the present invention will be described.

In the method according to Embodiment 2, an optimal parameter is searched for based on weight errors caused from one burst of signals. However, in some cases, such estimation based on weight errors caused from one burst of signals may not offer sufficient reliability.

Therefore, according to Embodiment 3 of the present invention, indicators such as weight errors representing the performance of the array processing are averaged over a plurality of frames up to the previous frame, thereby enabling highly reliable search for optimal array parameters.

FIG. 8A to FIG. 8D are tables exemplifying the processes for estimating an optimal array parameter by averaging over a plurality of frames as aforementioned.

Referring to FIG. 8A, it is assumed that the adaptive array process was executed with the setting of the updating step at 0.975 as array parameter 1 over 100 frames from frame T to frame T+100, and the weight errors resulted from the adaptive array processing in the corresponding slots in the respective 100 frames were averaged over the 100 frames, resulting in an average weight error of 2000.

Referring to FIG. 8B, it is assumed that the adaptive array process was executed with the setting of the updating step at a greater value of 0.98 as array parameter 2 over 100 frames from frame T+100 to frame T+200, and the weight errors resulted from the adaptive array processing in the corresponding slots in the respective 100 frames were averaged over the 100 frames, resulting in reducing the average weight error to 1000.

Referring to FIG. 8C, it is assumed that the adaptive array process was executed with the setting of the updating step at an further greater value of 0.985 as array parameter 3 over 100 frames from frame T+200 to frame T+300, and the weight errors resulted from the adaptive array processing in the corresponding slots in the respective 100 frames were averaged over the 100 frames, resulting in further reducing the average weight error to 800.

Referring to FIG. 8D, it is assumed that the adaptive array process was executed with the setting of the updating step at a further greater value of 0.99 as array parameter 4 over 100 frames from frame T+300 to frame T+400, and the weight errors resulted from the adaptive array processing in the corresponding slots in the respective 100 frames were averaged over the 100 frames, resulting in rather increasing the average weight error to 1200.

As described above, weight errors are averaged over each 100 frames while the array parameter is changed every 100 frames to search for an optimal value of the array parameter which minimizes the weight error.

While there have been described the processes for searching for an optimal value of the updating step as an array parameter in the example of FIGS. 8A to 8D, once an optimal value of the updating step has been estimated, optimal values of other array parameters (for example, the correlation initial value, the weight initial value, etc.) are searched for with the same processes.

Further, while in the example of FIGS. 8A to 8D, weight errors are used as indicators of the performance of the adaptive array process results, other indicators such as reception errors may be used.

Figure 9:
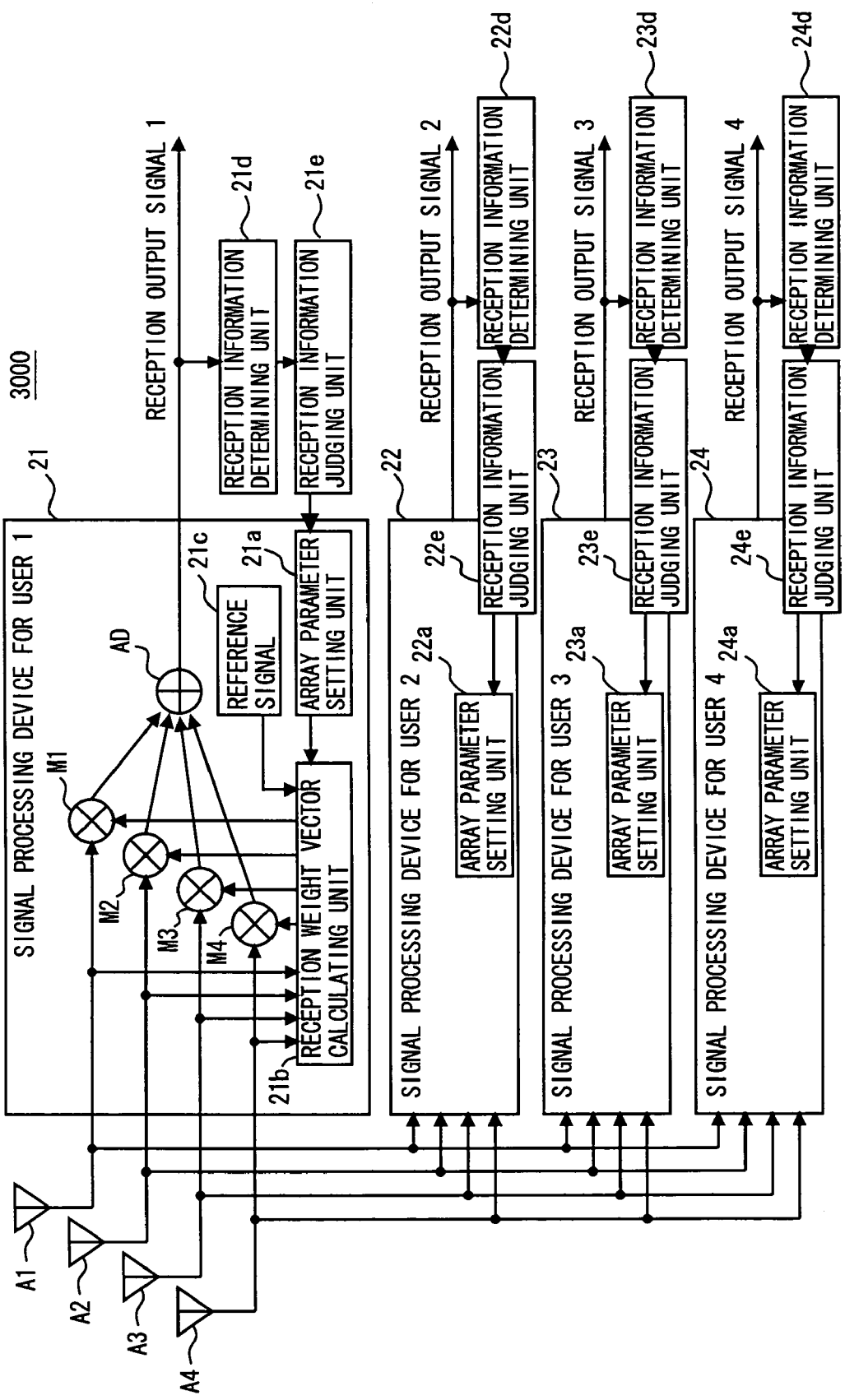
FIG. 9 is a functional block diagram showing a structure of a spatial multiplexing base station according to Embodiment 3 of the present invention.

FIG. 9 is a functional block diagram showing the structure of spatial multiplex base station 3000 according to Embodiment 3 of the present invention, which has been described with reference to FIGS. 8A to 8D. Spatial multiplex base station 3000 is a base station capable of multiplexing four connections.

Base station 3000 shown in FIG. 9 is different from base station 2000 shown in FIG. 6 in the following points.

Namely, there are provided user signal processing devices 21 to 24 instead of user signal processing devices 11 to 14 in FIG. 6 and there are provided reception information determining units 21d to 24d instead of reception information determining units 11d to 14d in FIG. 6. Furthermore, there are provided reception information judging units 21e to 24e instead of reception information judging units 15, 16 in FIG. 6.

Signal processing devices 21 to 24 all have the same structures, and therefore only the structure of first user signal processing device 21 is shown and the operation thereof will be described hereinafter. Also, the structures of the respective user signal processing devices shown in FIG. 9 are the same as those of the respective user signal processing devices shown in FIG. 6.

In the structure of FIG. 9, when four connections are being multiplexed, user signal processing devices 21 to 24 are respectively assigned to four users 1 to 4 and extract reception output signals 1 to 4 from signals from users 1 to 4, respectively.

Each of array parameter setting units 21a to 24a changes array parameter every 100 frames, for example, in accordance with the example of FIGS. 8A to 8D.

Reception information determining units 21d to 24d detect weight errors of the corresponding reception output signals and provide them to corresponding reception information judging unit 21e to 24e, respectively.

Each of reception information judging units 21e to 24e averages the weight errors provided from the corresponding reception information determining unit, for example, over each 100 frames, according to the example of FIGS. 8A to 8D. Each of reception information judging units 21e to 24e compares the results to determine an optimal parameter that yielded the minimum average weight error, and then sets this array parameter in the corresponding one of array parameter setting units 21a to 24a.

User signal processing devices 21 to 24 execute weight estimation in the respective reception weight vector calculating units, based on the array parameter set as described above.

Figure 10:
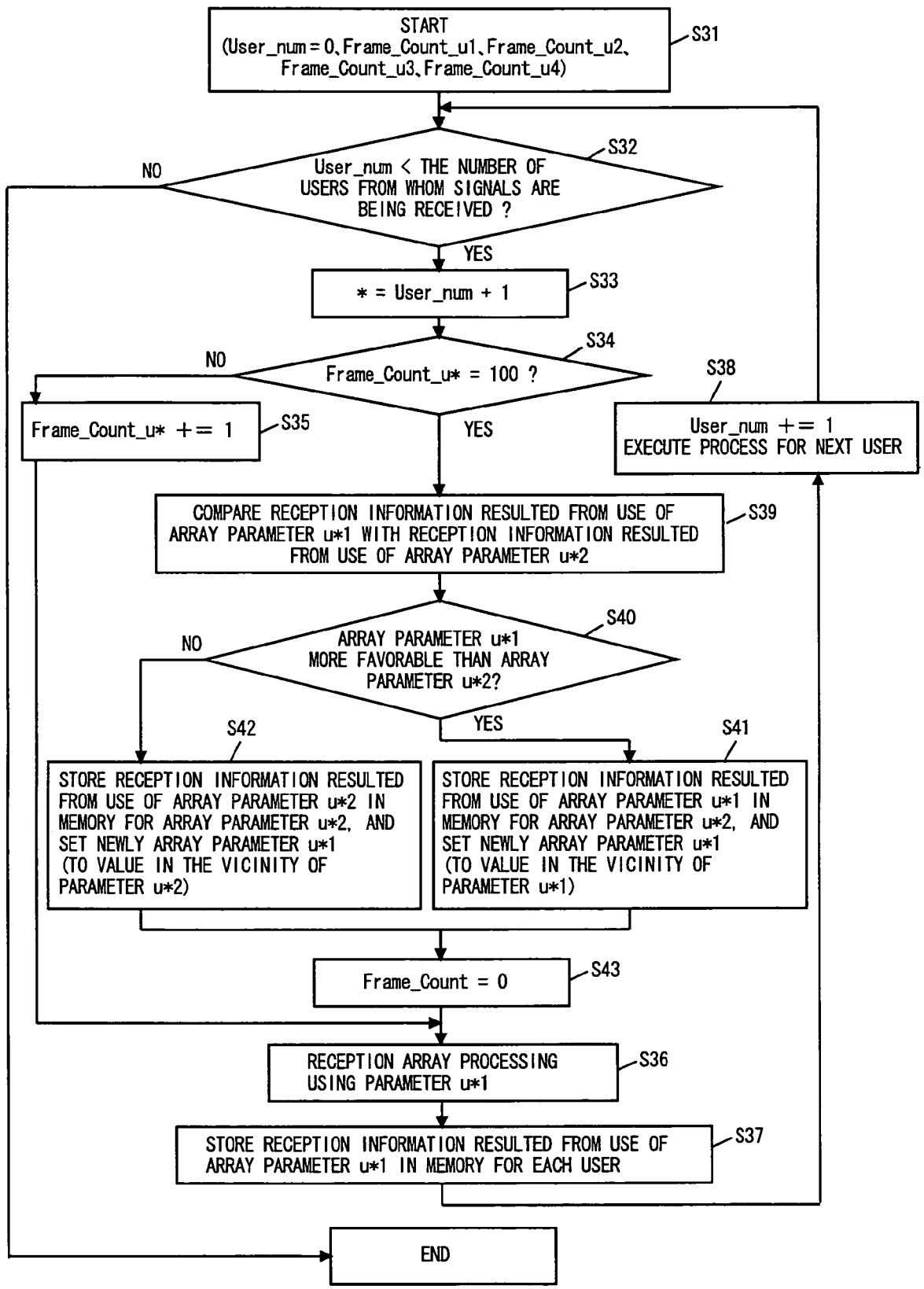
FIG. 10 is a flowchart showing an array parameter optimal value estimation method according to Embodiment 3 of the present invention.

FIG. 10 is a flowchart showing the processes executed by the DSP in base station 3000 of FIG. 9 for realizing the array parameter optimal value estimating method according to Embodiment 3 of the present invention, which has been described with reference to FIGS. 8A to 8D and FIG. 9. While results of the array processing in 100 frames are averaged in Embodiment 3 as described hereinbefore, the flowchart shown in FIG. 10 represents the processes in one of such 100 frames.

In the following description, array parameter u*1 refers to an array parameter which is estimated to be optimal from previous estimation results and which is to be newly set for a user having a number of * of the four users being multiplexed. Array parameter u*2 refers to the optimal parameter according to the past estimation results for the same user having the number * and which is to be used as an object of comparison with array parameter u*1.

Referring to FIG. 10, first, at step S31, the user number is initialized, and the estimation process is started with the frame count value for each user u1 to u4 continued from that of the previous frame.

At step S32, if the user number has not reached the number of users from whom signals are being received, the process proceeds to step S33. On the other hand, if it exceeds, the process ends.

At step S33, the number of the user for whom the process is to be executed, which is the initialized user number incremented by 1, is represented by the number *.

Then, at step S34, it is determined whether or not the frame count value for user u* having number * is 100. Here, it is assumed that the frame count value has not reached 100, in this frame. In this case, at step S35, the frame count value for user u* is incremented by 1 and then the process proceeds to step S36 where the reception adaptive array process is executed for this user using an array parameter u*1 for user u*.

Then, at step S37, information (e.g., a weight error) representing the result of reception using array parameter u*1 is calculated and stored in a memory for each user. Namely, the information (e.g., weight errors) concerning the reception results from a first frame to the current frame is cumulatively calculated (averaged) for each user.

Subsequently, at step S38, the user number is incremented by 1 and the process is executed for the next user. Namely, the processes at steps S32 to S37 are also executed for the next user and the result is stored in a memory for this user.

As described above, in one of the 100 frames, until it is determined at step S32 that the user number has exceeded the number of users from whom signals are being received, the reception result information in this frame is acquired and stored in a memory, and then the reception result information is averaged over a first frame to this frame for each user u1 to u4, at steps S33 to S37.

On the other hand, if it is determined at step S34 that the current frame is 100th frame, at step S39, for user u*, a comparison is made between the reception result information (e.g., an average weight error) resulted from the use of the newly set array parameter u*1, which has been calculated and stored in a memory, and the previous optimal reception result information (e.g., an average weight error) resulted from the use of an array parameter u*2, which is used as an object of comparison.

As a result, at step S40, if it is determined that the reception result information resulted from the use of newly set array parameter u*1 is more favorable than the previous optimal reception result information resulted from the use of array parameter u*2, it is determined that newly set array parameter u*1 is the optimal parameter according to the past estimation results and the process proceeds to step S41.

At step S41, the reception result information resulted from the use of array parameter u*1 is stored in the reception information memory for array parameter u*2, in order that it will be used as an array parameter u*2 which is an object of comparison, in the subsequent estimation process. Then, based on previous estimation results, an array parameter u*1 which is estimated to be optimal is newly set.

On the other hand, if it is determined at step S40 that the reception result resulted from the use of newly set array parameter u*1 is not more favorable than the reception result resulted from the use of array parameter u*2, it is determined that array parameter u*2 is still the optimal parameter according to the past estimation results and the process proceeds to step S42.

At step S42, the reception result resulted from the use of array parameter u*2 is stored in the reception information memory for array parameter u*2, in order that it will be still used as an array parameter u*2 which is an object of comparison, in the subsequent estimation process. Then, based on previous estimation results, an array parameter u*1 which is estimated to be optimal is newly set.

Once array parameter u*1 has been set in step S41 or S42, the frame count value is initialized at step S43, and then the reception adaptive array process is executed using array parameter u*1 at step S36 and the result information is stored in the memory for this user.

Subsequently, at step S38, the user number is incremented by 1 and the process is executed for the next user. Namely, the processes at the steps S32 to S34, S39 to S43, and S36 to S37 are also executed for the next user and the result is stored in a memory for this user.

Thus, in the 100th frame, until it is determined at step S32 that the user number has exceeded the number of users from whom signals are being received, an array parameter u*1 is newly set by step S33 to S34, S39 to S41, for each user u*1 to u*4.

As described above, according to Embodiment 3 of the present invention, the estimation of an optimal array parameter is performed while the process for averaging reception array results over a plurality of frames (for example, 100 frames) is executed, thereby offering highly reliable estimation results.

Further, while in the aforementioned embodiment, the present invention is applied to a base station in a mobile communication system, the present invention is not limited to a base station and may be also applied to a radio receiving device, such as an adaptive array terminal, which is capable of signal reception by the adaptive array processing.

As described above, according to the present invention, in a radio receiving device which receives signals by the adaptive array processing, optimal values of array parameters appropriate to the propagation environment of received signals are estimated and the array parameters are changed in an adaptive manner, and therefore the weight estimating ability is optimized regardless of variations of the propagation environment, thereby realizing optimal signal reception.

INDUSTRIAL APPLICABILITY

According to the present invention, there is provided a structure which optimizes the weight estimating ability regardless of variations of the propagation environment, and therefore the present invention is effective in improving the reception performance of a radio receiving device.

The invention claimed is:

1. A radio receiving device which has a plurality of antennas and which extracts a desired signal by adaptive array processing, the device comprising:
   an adaptive array processor configured to estimate weights for said plurality of antennas using a predetermined type of array parameter, assign said estimated weights to reception signals received by said plurality of antennas, and combine the weighted reception signals to extract said desired signal; and
   an array parameter optimal value estimation unit configured to estimate an optimal value of said predetermined type of array parameter which optimizes the weight estimation performance of said adaptive array processor, wherein
   said array parameter optimal value estimation unit includes:
   a determination unit configured to determine a propagation environment of said reception signals;
   a storage unit configured to previously a table consisting of optimal values of the array parameter corresponding to different conditions of said propagation environment; and
   a table reference unit configured to refer to said table, thereby estimating an optimal value of said array parameter appropriate to the propagation environment of the reception signals determined by said determination unit.

2. A radio receiving device which has a plurality of antennas and which extracts a desired signal by adaptive array processing, the device comprising:
   an adaptive array processor configured to estimate weights for said plurality of antennas using a predetermined type of array parameter, assign said estimated weights to reception signals received by said plurality of antennas, and combine the weighted reception signals to extract said desired signal; and
   an array parameter optimal value estimation unit configured to estimate an optimal value of said predetermined type of array parameter which optimizes the weight estimation performance of said adaptive array processor, wherein
   said array parameter optimal value estimation unit includes:
   an operation control unit configured to cause said adaptive array processor to operate multiple times in a single time slot, in correspondence with a plurality of values of said array parameter;
   an indicator calculation unit configured to calculate an indicator representing the weight estimation performance of said adaptive array processor corresponding to a current value of said array parameter, each time said adaptive array processor is operated; and
   an optimal value estimation unit configured to estimate a value of said array parameter which optimizes the weight estimation performance of said adaptive array processor in said time slot, based on said calculated indicators.

3. The radio receiving device according to claim 2, wherein
   said operation control unit employs, as one of the plurality of values of said array parameter in a succeeding time slot, the value of said array parameter estimated by said optimal value estimation unit in a preceding time slot; and
   said optimal value estimation unit estimates, based on the indicators calculated by said indicator calculation unit over a plurality of time slots, a value of said array parameter which optimizes the weight estimation performance of said adaptive array processor over said plurality of time slots.

4. The radio receiving device according to claim 1 or 2, wherein
   said array parameter optimal value estimation unit includes:
   an operation control unit configured to cause the adaptive array processor to operate in each of a plurality of time slots using a value of said array parameter which is fixed over said plurality of time slots;
   an indicator calculation unit configured to calculate an indicator representing the weight estimation performance of said adaptive array processor corresponding to a current fixed value of said array parameter, each time said adaptive array processor is operated;
   an averaging unit configured to average said calculated indicator over said plurality of time slots;
   a repeat control unit configured to cause said operation control unit , said indicator calculation unit and said averaging unit to repeatedly execute their operations over said plurality of time slots; and
   an optimal value estimation unit configured to determine a value of said array parameter which optimizes the weight estimation performance of said adaptive array processor, based on the indicators each averaged by said averaging unit over said corresponding plurality of time slots.

5. A radio receiving device which has a plurality of antennas and which enables spatial multiple connection of a plurality of users' terminals by adaptive array processing, the device comprising:
   an adaptive array processor, provided in correspondence with said respective users' terminals, configured to estimate weights for said plurality of antennas using a predetermined type of array parameter, assign said estimated weights to reception signals received by said plurality of antennas, and combine the weighted reception signals to extract a signal from said corresponding users' terminal; and
   an array parameter optimal value estimation unit configured to estimate optimal values of the predetermined type of array parameter which optimize the weight estimation performance of said respective adaptive array processor, wherein said array parameter optimal value estimation unit includes:

a determination unit configured to determine a propagation environment of said reception signal;

a storage unit configured to previously store a table consisting of optimal values of the array parameter corresponding to different conditions of said propagation environment; and a table reference unit configured to refer to said table, thereby estimating an optimal value of said array parameter appropriate to the propagation environment of the reception signals determined by said determination unit.

6. The radio receiving device according to claim 5, wherein said propagation environment is at least one of the degree of multiplexing of spatial multiple connection and the amount of fading.

7. A radio receiving device which has a plurality of antennas and which enables spatial multiple connection of a plurality of users' terminals by adaptive array processing, the device comprising:

an adaptive array processor, provided in correspondence with said respective users' terminals, configured to estimate weights for said plurality of antennas using a predetermined type of array parameter, assign said estimated weights to reception signals received by said plurality of antennas, and combine the weighted reception signals to extract a signal from said corresponding users' terminal; and an array parameter optimal value estimation unit configured to estimate optimal values of the predetermined type of array parameter which optimize the weight estimation performance of said respective adaptive array processor, wherein said array parameter optimal value estimation unit includes:

an operation control unit configured to cause said adaptive array processor to operate multiple times in a single time slot, in correspondence with a plurality of values of said array parameter;

an indicator calculation unit configured to calculate an indicator representing the weight estimation performance of said adaptive array processor corresponding to a current value of said array parameter, each time said adaptive array processor is operated; and an optimal value estimation unit configured to estimate a value of said array parameter which optimizes the weight estimation performance of said adaptive array processor in said time slot, based on said calculated indicators.

8. The radio receiving device according to claim 7, wherein said operation control unit employs, as one of the plurality of values of said array parameter in a succeeding time slot, the value of said array parameter estimated by said optimal value estimation unit in a preceding time slot; and said optimal value estimation unit estimates, based on the indicators calculated by said indicator calculation unit over a plurality of time slots, a value of said array parameter which optimizes the weight estimation performance of said adaptive array processor over said plurality of time slots.

9. A radio receiving device which has a plurality of antennas and which enables spatial multiple connection of a plurality of users' terminals by adaptive array processing, the device comprising:

an adaptive array processor, provided in correspondence with said respective users' terminals, configured to estimate weights for said plurality of antennas using a predetermined type of array parameter, assign said estimated weights to reception signals received by said plurality of antennas, and combine the weighted reception signals to extract a signal from said corresponding users' terminal; and an array parameter optimal value estimation unit configured to estimate optimal values of said predetermined type of array parameter which optimize the weight estimation performance of said respective adaptive array processor, wherein said array parameter optimal value estimation unit includes:

an operation control unit configured to cause the adaptive array processor to operate in each of a plurality of time slots using a value of said array parameter which is fixed over said plurality of time slots;

an indicator calculation unit configured to calculate an indicator representing the weight estimation performance of said adaptive array processor corresponding to a current fixed value of said array parameter, each time said adaptive array processor is operated;

an averaging unit configured to average said calculated indicators over said plurality of time slots;

a repeat control unit configured to cause said operation control unit, said indicator calculation unit and said averaging unit to repeatedly execute their operations over said plurality of time slots; and an optimal value estimation unit configured to determine a value of said array parameter which optimizes the weight estimation performance of said adaptive array processor, based on the indicators each averaged by said averaging unit over said plurality of time slots.

10. The radio receiving device according to any one of claims 1, 2, 3, 7, 8 and 9, wherein the indicator representing the weight estimation performance of said adaptive array processor is a weight estimation error.

11. An array parameter optimal value estimation method for use in a radio receiving device which has a plurality of antennas and which extracts a desired signal by adaptive array processing, the method comprising the steps of:

executing adaptive array processing for estimating weights for said plurality of antennas using a predetermined type of array parameter, assigning said estimated weights to reception signals received by said plurality of antennas, and combining the weighted reception signals to extract said desired signal; and estimating an optimal value of said predetermined type of array parameter which optimizes the weight estimation performance of said adaptive array processing, wherein the step of estimating an optimal value of said array parameter includes the steps of:

determining a propagation environment of said reception signals;

preparing in advance a table consisting of optimal values of said array parameter corresponding to different conditions of said propagation environment; and referring to said table, thereby estimating an optimal value of said array parameter appropriate to said determined propagation environment of the reception signals.

12. An array parameter optimal value estimation method for use in a radio receiving device which has a plurality of antennas and which extracts a desired signal by adaptive array processing, the method comprising the steps of:

executing adaptive array processing for estimating weights for said plurality of antennas using a predetermined type of array parameter, assigning said estimated weights to reception signals received by said plurality of antennas, and combining the weighted reception signals to extract said desired signal; and estimating an optimal value of said predetermined type of array parameter which optimizes the weight estimation performance of said adaptive array processing, wherein the step of estimating an optimal value of said array parameter includes the steps of:

causing said adaptive array processing step to be executed multiple times in a single time slot, in correspondence with a plurality of values of said array parameter;

calculating an indicator representing the weight estimation performance of said adaptive array processing corresponding to a current value of said array parameter, each time said adaptive array processing step is executed; and estimating a value of said array parameter which optimizes the weight estimation performance of said adaptive array processing in said time slot, based on said calculated indicators.

13. The array parameter optimal value estimation method according to claim 12, wherein the step of causing said adaptive array processing step to be executed multiple times includes the step of employing the value of said array parameter estimated in a preceding time slot, as one of the plurality of values of said array parameter in a succeeding time slot, and the step of estimating a value of said array parameter includes the step of estimating, based on the indicators calculated over a plurality of time slots, a value of said array parameter which optimizes the weight estimation performance of said adaptive array processing over said plurality of time slots.

14. The array parameter optimal value estimation method according to claim 11 or 12, wherein the step of estimating an optimal value of said array parameter includes the steps of:

causing the adaptive array processing step to be executed in each of a plurality of time slots using a value of said array parameter which is fixed over said plurality of time slots;

calculating an indicator representing the weight estimation performance of said adaptive array processing corresponding to a current fixed value of said array parameter, each time said adaptive array processing step is executed;

averaging said calculated indicators over said plurality of time slots;

causing the operations of the steps of causing said adaptive array processing step to be executed, calculating said indicator, and averaging over said plurality of time slots to be executed repeatedly; and determining a value of said array parameter which optimizes the weight estimation performance of said adaptive array processing, based on said indicators each averaged over said plurality of time slots.

15. An array parameter optimal value estimation method for use in a radio receiving device which has a plurality of antennas and which enables spatial multiple connection of a plurality of users' terminals by adaptive array processing, the method comprising the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding user's terminal; and estimating an optimal value of said predetermined type of array parameter which optimizes the weight estimation performance of said adaptive array processing, wherein the step of estimating the optimal value of said array parameter includes the steps of:

determining a propagation environment of said reception signals;

preparing in advance a table consisting of optimal values of said array parameter corresponding to different conditions of said propagation environment; and referring to said table, thereby estimating an optimal value of said array parameter appropriate to the determined propagation environment of said determined reception signals.

16. The array parameter optimal value estimation method according to claim 15, wherein said propagation environment is at least one of the degree of multiplexing of spatial multiplex connection and the amount of fading.

17. An array parameter optimal value estimation method for use in a radio receiving device which has a plurality of antennas and which enables spatial multiple connection of a plurality of users' terminals by adaptive array processing, the method comprising the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding users' terminal; and estimating an optimal value of the predetermined type of array parameter which optimizes the weight estimation performance of said adaptive array processing, wherein the step of estimating an optimal value of said array parameter includes the steps of:

causing said adaptive array processing step to be executed multiple times in a single time slot, in correspondence with a plurality of values of said array parameter;

calculating an indicator representing the weight estimation performance of said adaptive array processing corresponding to a current value of said array parameter, each time the adaptive array processing step is executed; and estimating a value of said array parameter which optimizes the weight estimation performance of said adaptive array processing in said time slot, based on said calculated indicators.

18. The array parameter optimal value estimation method according to claim 17, wherein the step of causing said adaptive array processing step to be executed multiple times includes the step of employing the value of said array parameter estimated in a preceding time slot, as one of the plurality of values of said array parameter in a succeeding time slot, and the step of estimating a value of said array parameter includes the step of estimating, based on said indicators calculated over a plurality of time slots, a value of said array parameter which optimizes the weight estimation performance of said adaptive array processing over said plurality of time slots.

19. An array parameter optimal value estimation method for use in a radio receiving device which has a plurality of antennas and which enables spatial multiple connection of a plurality of users' terminals by adaptive array processing, the method comprising the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding users' terminal; and estimating an optimal value of said predetermined type of array parameter which optimizes the weight estimation performance of said adaptive array processing, wherein the step of estimating an optimal value of said array parameter includes the steps of:

causing the adaptive array processing step to be executed in each of a plurality of time slots using a value of said array parameter which is fixed over said plurality of time slots;

calculating an indicator representing the weight estimation performance of said adaptive array processing corresponding to a current fixed value of said array parameter, each time said adaptive array processing step is executed;

averaging said calculated indicators over said plurality of time slots;

causing the operations of the steps of causing said adaptive array processing step to be executed, calculating said indicator, and averaging over said plurality of time slots to be executed repeatedly; and determining a value of said array parameter which optimizes the weight estimation performance of said adaptive array processing, based on the indicators each averaged over said plurality of time slots.

20. The array parameter optimal value estimation method according to any one of claims 11, 12, 13, 17, 18 and 19, wherein the indicator representing the weight estimation performance of said adaptive array processing is a weight estimation error.

21. An array parameter optimal value estimation program for use in a radio receiving device which has a plurality of antennas and which extracts a desired signal by adaptive array processing, the program causing a computer to execute the steps of:

executing the adaptive array processing for estimating weights for said plurality of antennas using a predetermined type of array parameter, assigning said estimated weights to reception signals received by said plurality of antennas, and combining the weighted reception signals to extract the desired signal; and estimating an optimal value of said predetermined type of array parameter which optimizes the weight estimation performance of said adaptive array processing, wherein the step of estimating an optimal value of said array parameter includes the steps of:

determining a propagation environment of said reception signals;

preparing in advance a table consisting of optimal values of said array parameter corresponding to different conditions of said propagation environment; and referring to said table, thereby estimating an optimal value of said array parameter appropriate to said determined propagation environment of the reception signals.

22. An array parameter optimal value estimation program for use in a radio receiving device which has a plurality of antennas and which extracts a desired signal by adaptive array processing, the program causing a computer to execute the steps of:

executing the adaptive array processing for estimating weights for said plurality of antennas using a predetermined type of array parameter, assigning said estimated weights to reception signals received by said plurality of antennas, and combining the weighted reception signals to extract the desired signal; and estimating an optimal value of said predetermined type of array parameter which optimizes the weight estimation performance of said adaptive array processing, wherein the step of estimating an optimal value of said array parameter includes the steps of:

causing said adaptive array processing step to be executed multiple times in a single time slot, in correspondence with a plurality of values of said array parameter;

calculating an indicator representing the weight estimation performance of said adaptive array processing corresponding to a current value of said array parameter, each time said adaptive array processing step is executed; and estimating a value of said array parameter which optimizes the weight estimation performance of said adaptive array processing in said time slot, based on said calculated indicators.

23. The array parameter optimal value estimation program according to claim 22, wherein the step of causing said adaptive array processing step to be executed multiple times includes the step of employing the value of said array parameter estimated in a preceding time slot, as one of the plurality of values of said array parameter in a succeeding time slot, and the step of estimating a value of said array parameter includes the step of estimating, based on the indicators calculated over a plurality of time slots, a value of said array parameter which optimizes the weight estimation performance of said adaptive array processing over said plurality of time slots.

24. The array parameter optimal value estimation program according to claim 21 or 22, wherein the step of estimating an optimal value of said array parameter includes the steps of:

causing the adaptive array processing step to be executed in each of a plurality of time slots using a value of said array parameter which is fixed over said plurality of time slots;

calculating an indicator representing the weight estimation performance of said adaptive array processing corresponding to a current fixed value of said array parameter, each time said adaptive array processing step is executed;

averaging said calculated indicators over said plurality of time slots;

causing the operations of the steps of causing said adaptive array processing step to be executed, calculating said indicator, and averaging over said plurality of time slots to be executed repeatedly; and determining a value of said array parameter which optimizes the weight estimation performance of said adaptive array processing, based on the indicators each averaged over said plurality of time slots.

25. An array parameter optimal value estimation program for use in a radio receiving device which has a plurality of antennas and which enables spatial multiple connection of a plurality of users' terminals by adaptive array processing, the program causing a computer to execute the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding users' terminal; and estimating an optimal value of said predetermined type of array parameter which optimizes the weight estimation performance of said adaptive array processing, wherein the step of estimating an optimal value of said array parameter includes the steps of:

determining a propagation environment of said reception signals;

preparing in advance a table consisting of optimal values of said array parameter corresponding to different conditions of said propagation environment; and referring to said table, thereby estimating an optimal value of said array parameter appropriate to the determined propagation environment of said reception signals.

26. The array parameter optimal value estimation program according to claim 25, wherein said propagation environment is at least one of the degree of multiplexing of spatial multiple connection and the amount of fading.

27. An array parameter optimal value estimation program for use in a radio receiving device which has a plurality of antennas and which enables spatial multiple connection of a plurality of users' terminals by adaptive array processing, the program causing a computer to execute the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding users' terminal; and estimating an optimal value of the predetermined type of array parameter which optimizes the weight estimation performance of said adaptive array processing, wherein the step of estimating an optimal value of said array parameter includes the steps of:

causing said adaptive array processing step to be executed multiple times in a single time slot, in correspondence with a plurality of values of said array parameter;

calculating an indicator representing the weight estimation performance of said adaptive array processing corresponding to a current value of said array parameter, each time said adaptive array processing step is executed; and estimating a value of said array parameter which optimizes the weight estimation performance of said adaptive array processing in said time slot, based on said calculated indicators.

28. The array parameter optimal value estimation program according to claim 27, wherein the step of causing said adaptive array processing step to be executed multiple times includes the step of employing the value of said array parameter estimated in a preceding time slot, as one of the plurality of values of said array parameter in a succeeding time slot, and the step of estimating a value of said array parameter includes the step of estimating, based on said indicators calculated over a plurality of time slots, a value of said array parameter which optimizes the weight estimation performance of said adaptive array processing over said plurality of time slots.

29. An array parameter optimal value estimation program for use in a radio receiving device which has a plurality of antennas and which enables spatial multiple connection of a plurality of users' terminal by adaptive array processing, the program causing a computer to execute the steps of:

executing, for said respective users' terminals, the adaptive array processing for estimating weights for said plurality of antennas using a predetermined type of array parameter, assigning said estimated weights to reception signals received by said plurality of antennas, and combining the weighted reception signals to extract a signal from said corresponding users' terminal; and estimating an optimal value of said predetermined type of array parameter which optimizes the weight estimation performance of said adaptive array processing, wherein the step of estimating an optimal value of said array parameter includes the steps of:

causing the adaptive array processing step to be executed in each of a plurality of time slots using a value of said array parameter which is fixed over said plurality of time slots;

calculating an indicator representing the weight estimation performance of said adaptive array processing corresponding to a current fixed value of said array parameter, each time said adaptive array processing step is executed;

averaging said calculated indicators over said plurality of time slots;

causing the operations of the steps of causing said adaptive array processing step to be executed, calculating said indicator, and averaging over said plurality of time slots to be executed repeatedly; and determining a value of said array parameter which optimizes the weight estimation performance of said adaptive array processing means, based on the indicators each averaged over said plurality of time slots.

30. The array parameter optimal value estimation program according to any one of claims 21, 22, 23, 27, 28 and 29, wherein the indicator representing the weight estimation performance of said adaptive array processing means is a weight estimation error.

* * * * *